(12) United States Patent
Haruki et al.

(10) Patent No.: US 7,707,645 B2
(45) Date of Patent: *Apr. 27, 2010

(54) MICROPROCESSOR

(75) Inventors: Hiroyoshi Haruki, Kanagawa (JP);
Mikio Hashimoto, Kanagawa (JP);
Takeshi Kawabata, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1317 days.

This patent is subject to a terminal disclaimer.

(21) Appl. No.: 11/159,230

(22) Filed: Jun. 23, 2005

(65) Prior Publication Data

US 2006/0005260 A1 Jan. 5, 2006

(30) Foreign Application Priority Data

| Jun. 24, 2004 | (JP) | ............................. 2004-186910 |
| Aug. 3, 2004 | (JP) | ............................. 2004-226886 |
| Apr. 21, 2005 | (JP) | ............................. 2005-124116 |

(51) Int. Cl.
*G06F 7/04* (2006.01)
*G06F 17/30* (2006.01)
*H04N 7/16* (2006.01)

(52) U.S. Cl. ........................................ 726/27; 713/193
(58) Field of Classification Search ................. 713/193; 726/27, 28, 29, 30
See application file for complete search history.

(56) References Cited

U.S. PATENT DOCUMENTS

| 4,847,902 | A | * | 7/1989 | Hampson | ..................... 713/190 |
| 5,963,642 | A | * | 10/1999 | Goldstein | .................... 713/193 |
| 6,003,117 | A | * | 12/1999 | Buer et al. | ................... 711/163 |
| 6,052,780 | A | * | 4/2000 | Glover | ........................ 713/193 |
| 6,075,862 | A | * | 6/2000 | Yoshida et al. | ................ 380/28 |
| 6,173,403 | B1 | * | 1/2001 | DeMont | ...................... 713/185 |
| 6,182,217 | B1 | * | 1/2001 | Sedlak | ........................ 713/172 |
| 6,202,152 | B1 | * | 3/2001 | Yuenyongsgool et al. | ... 713/189 |
| 6,345,359 | B1 | * | 2/2002 | Bianco | ........................ 713/190 |
| 6,499,106 | B1 | * | 12/2002 | Yaegashi et al. | ............ 713/193 |
| 6,523,118 | B1 | * | 2/2003 | Buer | .......................... 713/189 |
| 6,678,803 | B2 | * | 1/2004 | LaBerge | ..................... 711/154 |
| 6,707,736 | B2 | | 3/2004 | Miyakawa et al. | |
| 6,708,274 | B2 | * | 3/2004 | Herbert et al. | .............. 713/190 |
| 6,832,318 | B1 | * | 12/2004 | Yaegashi et al. | ............ 713/193 |

(Continued)

OTHER PUBLICATIONS

Lie et al., "Architectural Support for Copy and Tamper Resistant Software", Proceedings of ASPLOS, (2000).

(Continued)

*Primary Examiner*—David Garcia Cervetti
(74) *Attorney, Agent, or Firm*—Finnegan, Henderson, Farabow, Garrett & Dunner, L.L.P.

(57) ABSTRACT

A microprocessor includes a decryption unit that decrypts information to be utilized by a processor core to obtain plaintext information when the acquired information is encrypted; and a plaintext information storing unit that stores the plaintext information. The microprocessor also includes a protected attribute adding unit that adds a protected attribute indicating one of protection and non-protection to the plaintext information based on whether the decryption has been performed; an access request acquiring unit that acquires an access request to the plaintext information; a request type identifying unit that identifies a type of request of the access request; and an access controlling unit that controls an access to the plaintext information based on the type of request and the protected attribute.

40 Claims, 28 Drawing Sheets

U.S. PATENT DOCUMENTS

| | | | |
|---|---|---|---|
| 6,895,506 B1 * | 5/2005 | Abu-Husein | 713/193 |
| 6,910,094 B1 * | 6/2005 | Eslinger et al. | 711/5 |
| 6,957,342 B2 * | 10/2005 | Vatanen | 713/192 |
| 7,051,332 B2 * | 5/2006 | Gatto et al. | 718/108 |
| 7,080,258 B2 * | 7/2006 | Kawasaki et al. | 713/189 |
| 7,080,359 B2 * | 7/2006 | Ullmann et al. | 717/128 |
| 7,089,419 B2 * | 8/2006 | Foster et al. | 713/166 |
| 7,134,137 B2 * | 11/2006 | Joshi et al. | 726/1 |
| 7,149,901 B2 * | 12/2006 | Herbert et al. | 713/190 |
| 7,162,735 B2 * | 1/2007 | Safa | 726/6 |
| 7,188,282 B2 * | 3/2007 | Walmsley | 714/718 |
| 7,203,844 B1 * | 4/2007 | Oxford | 713/193 |
| 7,219,369 B2 * | 5/2007 | Hashimoto et al. | 726/21 |
| 7,260,217 B1 * | 8/2007 | Carlson | 380/37 |
| 7,296,163 B2 * | 11/2007 | Cybenko | 713/190 |
| 7,302,592 B2 * | 11/2007 | Shipton et al. | 713/300 |
| 7,348,887 B1 * | 3/2008 | Warner et al. | 340/572.3 |
| 7,350,081 B1 * | 3/2008 | Best | 713/190 |
| 7,373,670 B2 * | 5/2008 | Mimatsu et al. | 726/27 |
| 7,526,648 B2 * | 4/2009 | Arditti et al. | 713/175 |
| 7,590,846 B2 * | 9/2009 | Girault | 713/172 |
| 2001/0014157 A1 | 8/2001 | Hashimoto et al. | |
| 2001/0018736 A1 * | 8/2001 | Hashimoto et al. | 713/1 |
| 2001/0044901 A1 * | 11/2001 | Grawrock | 713/189 |
| 2002/0007440 A1 * | 1/2002 | Hosoya et al. | 711/122 |
| 2002/0010856 A1 * | 1/2002 | Kawasaki et al. | 713/168 |
| 2002/0051536 A1 | 5/2002 | Shirakawa et al. | |
| 2002/0053024 A1 | 5/2002 | Hashimoto et al. | |
| 2002/0101995 A1 | 8/2002 | Hashimoto et al. | |
| 2002/0194130 A1 * | 12/2002 | Maegawa et al. | 705/51 |
| 2003/0023871 A1 | 1/2003 | Gnanasabapathy et al. | |
| 2003/0033537 A1 | 2/2003 | Fujimoto et al. | |
| 2003/0079133 A1 * | 4/2003 | Breiter et al. | 713/182 |
| 2003/0084281 A1 * | 5/2003 | Abiko et al. | 713/154 |
| 2003/0126458 A1 * | 7/2003 | Teramoto et al. | 713/194 |
| 2003/0182571 A1 * | 9/2003 | Hashimoto et al. | 713/194 |
| 2003/0200454 A1 * | 10/2003 | Foster et al. | 713/200 |
| 2004/0030911 A1 * | 2/2004 | Isozaki et al. | 713/193 |
| 2004/0093506 A1 * | 5/2004 | Grawrock et al. | 713/189 |
| 2004/0139341 A1 | 7/2004 | Yamaguchi et al. | |
| 2004/0143748 A1 | 7/2004 | Yamaguchi et al. | |
| 2004/0176068 A1 * | 9/2004 | Paatero | 455/410 |
| 2004/0255199 A1 * | 12/2004 | Yamashita | 714/37 |
| 2005/0105738 A1 | 5/2005 | Hashimoto | |
| 2005/0144438 A1 | 6/2005 | Hashimoto et al. | |
| 2006/0015748 A1 * | 1/2006 | Goto et al. | 713/190 |
| 2006/0059368 A1 * | 3/2006 | Fayad et al. | 713/189 |
| 2006/0059369 A1 * | 3/2006 | Fayad et al. | 713/189 |
| 2006/0117177 A1 * | 6/2006 | Buer | 713/155 |

OTHER PUBLICATIONS

Haruki et al., "Microprocessor", U.S. Appl. No. 11/175,296, filed Jul. 7, 2005.

U.S. Appl. No. 11/060,704, filed Feb. 18, 2005, to Haruki et al.

* cited by examiner

| KEY ID | CIPHER KEY |
|--------|------------|
| 1 | 01234567 |
| 2 | 89abcdef |
| 3 | fedcda98 |
| 4 | 76543210 |
| ⋮ | ⋮ |

| KEY ID | PROTECTED ATTRIBUTE |
|--------|---------------------|
| PLAINTEXT (0) | NON-PROTECTION (0) |
| OTHERS | PROTECTION (1) |

FIG.4

| TYPE OF REQUEST | ATTRIBUTE | OUTPUT |
|-----------------|-----------|--------|
| * | NON-PROTECTION | PLAINTEXT PROGRAM |
| INSTRUCTION FETCH BY PROCESSOR CORE | PROTECTION | PLAINTEXT PROGRAM |
| OTHERS | PROTECTION | ERROR |

FIG.8

| PROGRAM ID | PROTECTED ATTRIBUTE |
|---|---|
| 0001 | 1 (PROTECTION) |
| 0002 | 0 (NON-PROTECTION) |
| ⋮ | ⋮ |

FIG.9

| BANK | PROTECTED ATTRIBUTE |
|---|---|
| BANK1 | 1 (PROTECTION) |
| BANK2 | 0 (NON-PROTECTION) |
| ⋮ | ⋮ |

FIG.19

| TYPE OF REQUEST | KEY ID OF INSTRUCTION KEY ID MEMORY | STATE | OUTPUT |
|---|---|---|---|
| * | 0 (NON-PROTECTION) | INITIALIZED/ NON-PROTECTED | PLAINTEXT PROGRAM |
| FETCH BY PROCESSOR CORE | OTHER THAN 0 (PROTECTION) | PROTECTED | PLAINTEXT PROGRAM |
| OTHERS | OTHER THAN 0 (PROTECTION) | PROTECTED | ERROR |
| COMBINATIONS OTHER THAN LISTED ABOVE | | | ERROR |

FIG.20

| KEY ID OF INSTRUCTION KEY ID MEMORY | STATE | ACQUIRED KEY ID | OPERATION |
|---|---|---|---|
| 0 (NON-PROTECTION) | INITIALIZED | * | WRITING PERMITTED |
| 0 (NON-PROTECTION) | NON-PROTECTED | 0 (NON-PROTECTION) | WRITING PERMITTED |
| 0 (NON-PROTECTION) | NON-PROTECTED | OTHER THAN 0 (PROTECTION) | ERROR |
| OTHER THAN 0 (PROTECTION) | PROTECTED | 0 (NON-PROTECTION) | ERROR |
| OTHER THAN 0 (PROTECTION) | PROTECTED | SAME KEY ID AS KEY ID OF INSTRUCTION KEY ID MEMORY | WRITING PERMITTED |
| OTHER THAN 0 (PROTECTION) | PROTECTED | DIFFERENT KEY ID FROM KEY ID OF INSTRUCTION KEY ID MEMORY | ERROR |
| COMBINATIONS OTHER THAN LISTED ABOVE | | | ERROR |

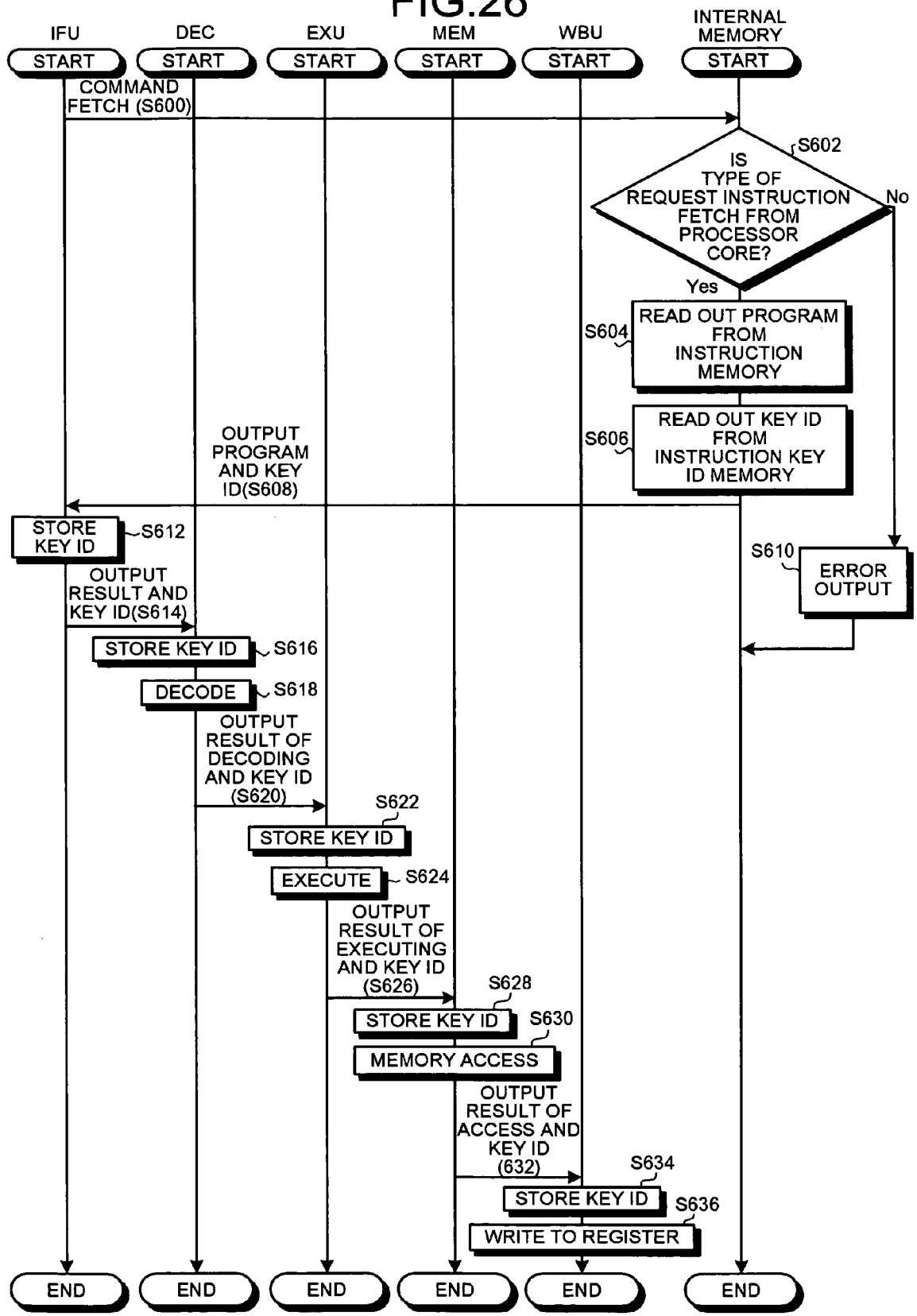

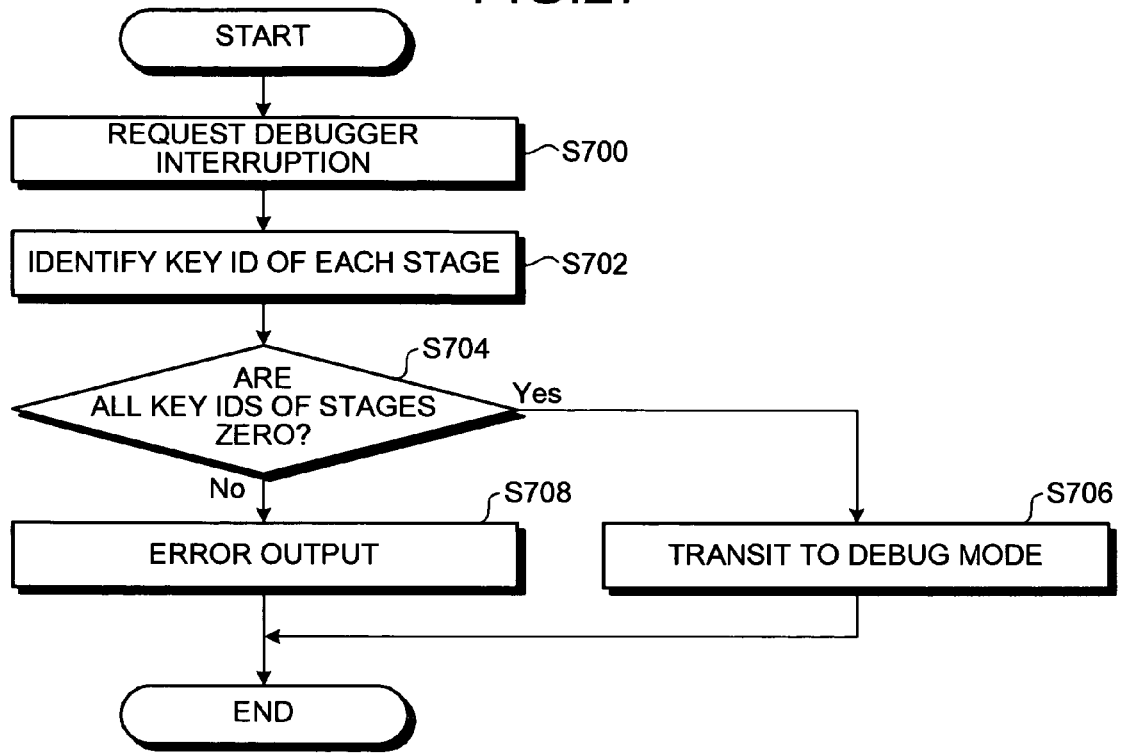
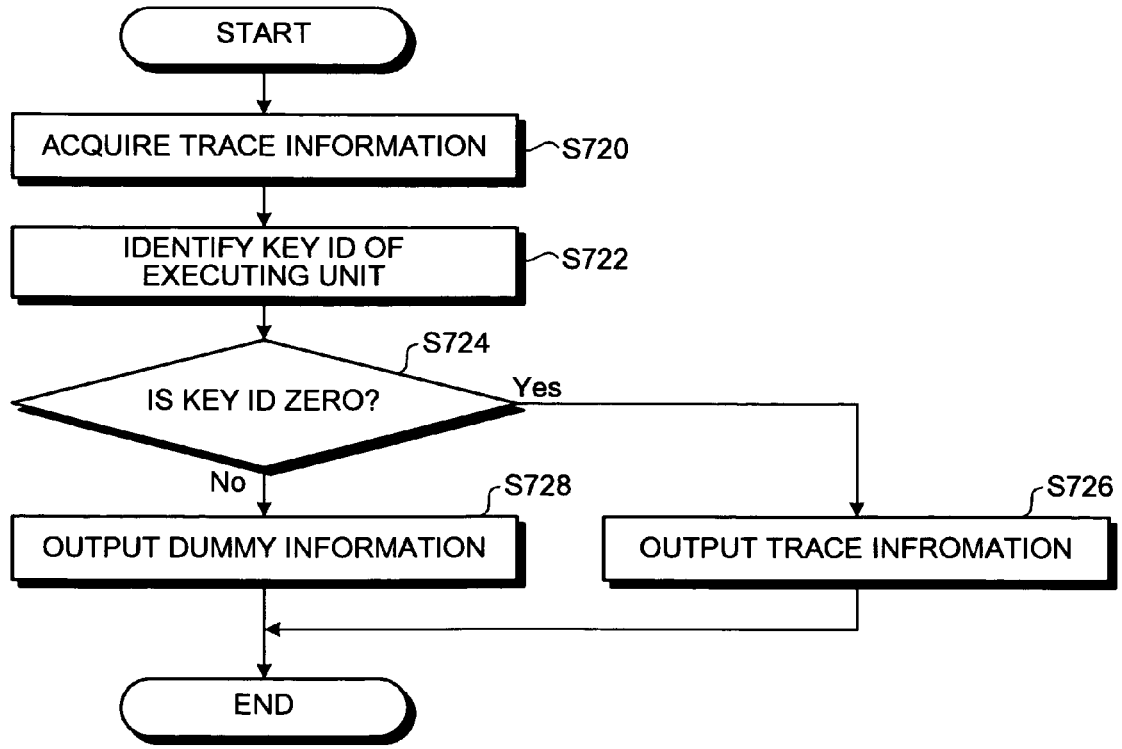

FIG.30

| KEY ID OF DATA KEY ID MEMORY | ACQUIRED KEY ID | STATE | OUTPUT |
|---|---|---|---|
| 0 (NON-PROTECTION) | * | INITIALIZED /NON-PROTECTED | PLAINTEXT DATA |
| OTHER THAN 0 (PROTECTION) | SAME KEY ID AS DATA KEY ID | PROTECTED | PLAINTEXT DATA |
| OTHER THAN 0 (PROTECTION) | DIFFERENT KEY ID FROM DATA KEY ID | PROTECTED | ERROR |
| COMBINATIONS OTHER THAN LISTED ABOVE | | | ERROR |

FIG.31

| KEY ID OF DATA KEY ID MEMORY | ACQUIRED KEY ID | STATE | OPERATION |
|---|---|---|---|
| 0 (NON-PROTECTION) | * | INITIALIZED | WRITING PERMITTED |
| 0 (NON-PROTECTION) | 0 (NON-PROTECTION) | NON-PROTECTED | WRITING PERMITTED |
| OTHER THAN 0 (PROTECTION) | SAME KEY ID AS DATA KEY ID | PROTECTED | WRITING PERMITTED |
| OTHER THAN 0 (PROTECTION) | DIFFERENT KEY ID FROM DATA KEY ID | PROTECTED | ERROR |
| COMBINATIONS OTHER THAN LISTED ABOVE | | | ERROR |

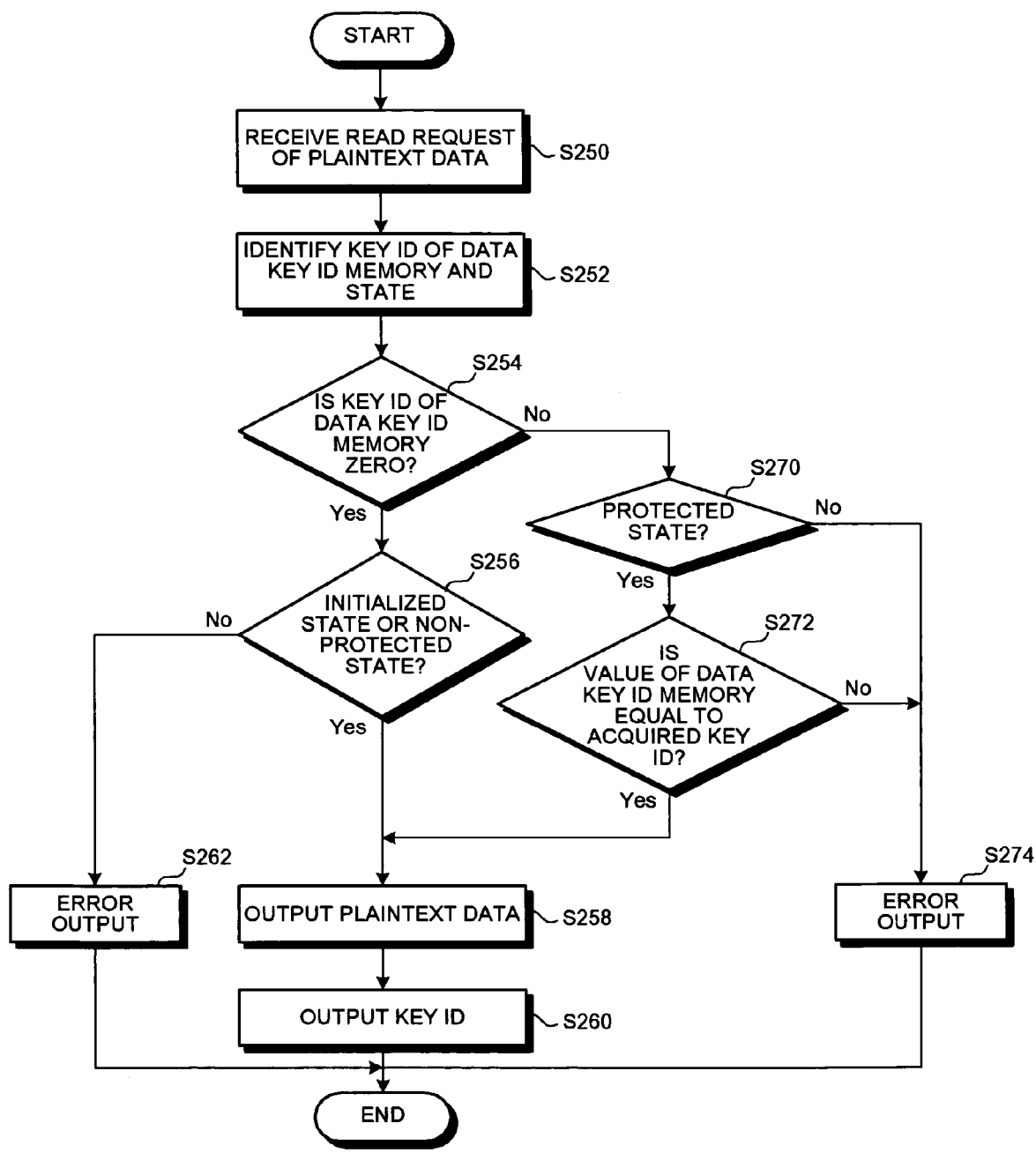

MICROPROCESSOR

CROSS-REFERENCE TO RELATED APPLICATIONS

This application is based upon and claims the benefit of priority from the prior Japanese Patent Application No. 2004-186910, filed on Jun. 24, 2004; Japanese Patent Application No. 2004-226886, filed on Aug. 3, 2004, and Japanese Patent Application No. 2005-124116, filed on Apr. 21, 2005, the entire contents of all of which are incorporated herein by reference.

BACKGROUND OF THE INVENTION

1. Field of the Invention

The present invention relates to a microprocessor having a processor core.

2. Description of the Related Art

According to a conventionally known technique, an embedded debugger interface is provided in a microprocessor and connected to a debugger, to allow an analysis of an internal condition of the processor to facilitate debugging at software development.

According to the conventional technique, the user can access from the debugger to resources such as a register and a memory inside the processor via the debugger interface embedded in the processor. In addition, the user can make the processor perform a stepwise execution.

The built-in debugger interface, however, facilitates not only the program verification by a legitimate software developer but also the software analysis by other software developers and users.

For example, if developed software contains confidential information, protection is necessary against analysis by software users as well as other software developers.

To this end, Japanese Patent Application Laid-Open No. 2002-244757, for example, proposes a method to disable a debugging function with use of a key selected at decryption, a method to disable a debugging operation when a protected program stored in a memory of the processor is selected as a debug target.

In some cases, however, a protected program and a non-protected program exist together. Then, an access from the debugger should be disabled only for the protected programs. Thus, there is a growing demand for a microprocessor which allows a flexible program protection.

SUMMARY OF THE INVENTION

According to one aspect of the present invention, a microprocessor includes an information acquiring unit that acquires information to be utilized by a processor core from outside; a decryption unit that decrypts the acquired information to obtain plaintext information, when the acquired information is encrypted; a plaintext information storing unit that stores the plaintext information obtained by decryption; a protected attribute adding unit that adds a protected attribute indicating one of protection and non-protection to the plaintext information based on whether the decryption has been performed; an access request acquiring unit that acquires an access request to the plaintext information; a request type identifying unit that identifies a type of request of the access request; and an access controlling unit that controls an access to the plaintext information based on the type of request and the protected attribute.

According to another aspect of the present invention, a microprocessor includes an information acquiring unit that acquires information to be utilized by a processor core from outside; a decryption unit that decrypts the acquired information to obtain plaintext information, when the acquired information is encrypted; a plaintext information storing unit that stores the plaintext information obtained by decryption; a cipher key storing unit that stores a cipher key to be utilized for decryption; a key identification information adding unit that adds key identification information to identify the cipher key to the plaintext information; a key identification information storing unit that stores the key identification information; an access request acquiring unit that acquires an access request to the plaintext information; a request type identifying unit that identifies a type of request of the access request; and an access controlling unit that controls an access to the plaintext information based on the type of request and the key identification information.

According to still another aspect of the present invention, a microprocessor includes a protected attribute storing unit that stores a protected attribute for a program executed by each stage of a pipeline in association with each stage; a debug request acquiring unit that acquires a debug request from a debugger; and a debug interruption controlling unit that permits an access from the debugger when the all protected attributes at a time the debug request is acquired indicate non-protection.

According to still another aspect of the present invention, a microprocessor includes a protected attribute storing unit that stores a protected attribute for a program executed by a processor core; and a trace information output controlling unit that permits an output of trace information acquired from the microprocessor when the protected attribute indicates non-protection.

BRIEF DESCRIPTION OF THE DRAWINGS

FIG. 2 is a schematic diagram of a data structure of a key table; and

FIG. 3 is a diagram of a protected attribute determination table utilized for adding a protected attribute by a protected attribute adding unit;

FIG. 4 is a schematic diagram of a access control rule by an instruction memory access controlling unit;

FIG. 8 is a schematic diagram of a data structure of a protected attribute memory according to a first modification of the first embodiment;

FIG. 9 is a schematic diagram of a data structure of the protected attribute memory according to a second modification of the first embodiment;

FIG. 19 is a schematic diagram of a rule of access control for data reading in the instruction memory access controlling unit;

FIG. 20 is a schematic diagram of a rule of access control for data writing in the instruction memory access controlling unit;

FIG. 26 is a flowchart of a process at a program execution by the processor core of the system according to the fifth embodiment;

FIG. 27 is a flowchart of a debugger interruption process where a debugger interruption is performed to the processor core;

FIG. 28 is a flowchart of a trace information output process where trace information is output from the processor core;

FIG. 30 is a schematic diagram of a rule of data reading access control by a data memory access controlling unit;

FIG. 31 is a schematic diagram of a rule of data writing access control by the data memory access controlling unit;

FIG. 34 is a flowchart of a reading process where data stored in the internal memory is read out.

DETAILED DESCRIPTION OF THE PREFERRED EMBODIMENTS

In the following, embodiments of a microprocessor according to the present invention are described in detail with reference to the accompanying drawings. It should be noted that the present invention is not limited to the embodiments described below.

Figure 1:
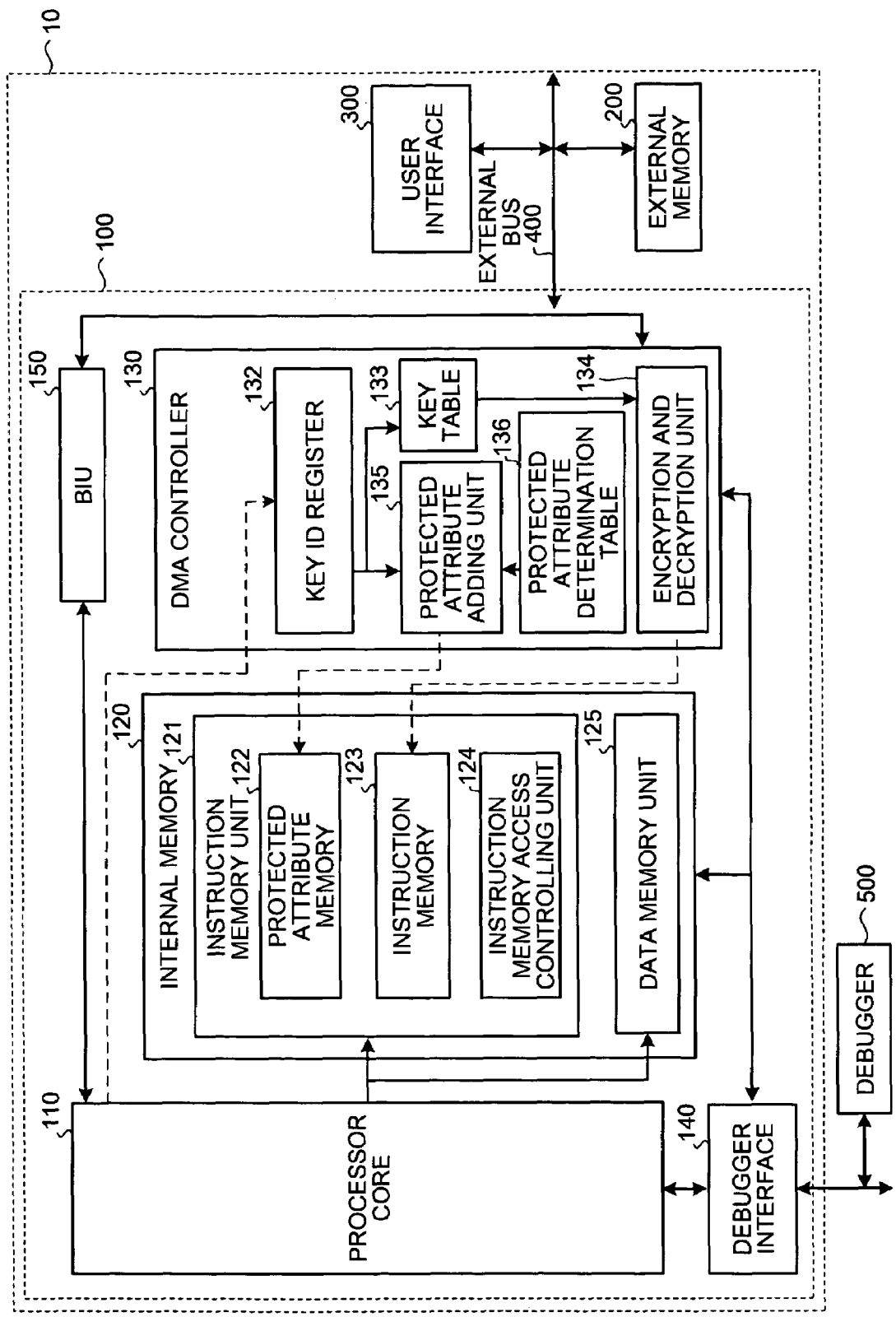
FIG. 1 is a diagram of an overall structure of a system including a microprocessor according to a first embodiment of the present invention.

FIG. 1 is a diagram of an overall structure of a system 10 having a microprocessor according to a first embodiment of the present invention. The system 10 includes a processor 100, an external memory 200, a user interface 300, and an external bus 400. The processor 100 is provided with a processor core 110, an internal memory 120, a direct memory access (DMA) controller 130, a debugger interface 140, and a bus interface unit (BIU) 150.

The external memory 200 stores a program to be executed by the processor core 110. The external memory 200 stores an encrypted program and a plaintext program.

The DMA controller 130 transfers data between the external memory 200 and the internal memory 120. The DMA controller 130, when acquiring an encrypted program, performs decryption thereof to turn the same into a plaintext program and stores the resulting plaintext program in the internal memory 120. On the other hand, on acquiring a plaintext program, the DMA controller 130 stores the same as it is in the internal memory 120.

The processor core 110 reads out a program stored in the internal memory 120, a cache controller (not shown), and the external memory 200, to execute the program. The BIU 150 is an interface for input/output from/to external devices. The BIU 150 reads/writes data from/into the external memory 200 according to a request from the processor core 110 or the cache controller (not shown).

The debugger interface 140 is connected to a debugger 500 outside the system 10. The debugger interface 140 on receiving a request from the debugger 500 sorts the request to the processor core 110, the internal memory 120, the DMA controller 130 or the like. In addition, on receiving a result of execution from each device in response to the sorted request, the debugger interface 140 sends back the received result of execution to the debugger 500.

The DMA controller 130 has a key ID register 132, a key table 133, a encryption and decryption unit 134, and a protected attribute adding unit 135.

In the key ID register 132, a key ID is set for the identification of a cipher key and used at decryption of a program read out from the external memory 200. Here, the value of the key ID is set by the user via the user interface. When the program read out from the external memory 200 is an non-encrypted plaintext program, "0" is set in the key ID register 132. Alternatively, the value of the key ID may be automatically set in response to the program execution.

The key table 133 stores the key IDs and the cipher keys in association with each other. FIG. 2 is a schematic description of a data structure of the key table 133. The key table 133 stores the cipher keys and the key IDs for the identification of the cipher keys in association with each other. Here, the key ID to be stored in the key table 133 is a value other than "0".

Thus, depending on the value set in the key ID register 132, i.e., whether the set value is "0" or not, it can be known whether the decryption has been done or not, in other words, whether the program is acquired in an encrypted form or not.

When a value other than "0" is set in the key ID register 132, the program acquired from the external memory 200 is an encrypted program. Then, the encryption and decryption unit 134 identifies a cipher key corresponding to the set key ID in the key ID register 132 with the use of the key table 133. The encryption and decryption unit 134 decrypts the encrypted program to obtain a plaintext program using the identified cipher key. The encryption and decryption unit 134 does not perform decryption when "0" is set in the key ID register 134, in other words, when the acquired program is a plaintext program.

The protected attribute adding unit 135 adds a protected attribute to the program acquired from the external memory 200. FIG. 3 shows a protected attribute determination table 136 utilized for the grant of the protected attribute by the protected attribute adding unit 135.

As shown in FIG. 3, the protected attribute adding unit 135, when "0" is set in the key ID register 132, adds protected attribute "0" which indicates non-protection to the corresponding program. When a value other than "0" is set in the key ID register 132, the protected attribute adding unit 135 adds protected attribute "1" which indicates protection to the corresponding plaintext program. In other words, the protected attribute adding unit 135 adds a protected attribute that indicates the protection to programs that are acquired in the encrypted form from outside, whereas adds a protected attribute that indicates the non-protection to programs that are acquired in the plaintext form from outside.

Thus, only the program acquired in the encrypted form becomes a target of protection.

In the first embodiment, the values "0" and "1" are used to show the protected attributes. However, any value can be employed to indicate the protected attribute as far as it can identify "protection" or "non-protection". For example, values set in the key ID register 132 can be employed as protected attributes, or the values of the cipher keys can be employed as well.

The protected attribute adding unit 135 makes the internal memory 120 store the protected attribute added to the plaintext program in association with the corresponding plaintext program.

The internal memory 120 has an instruction memory unit 121 that stores the program(s) and a data memory unit 125 that stores data. The instruction memory unit 121 further includes a protected attribute memory 122, an instruction memory 123, and an instruction memory access controlling unit 124.

The instruction memory 123 stores the plaintext program acquired from the encryption and decryption unit 134. The protected attribute memory 122 stores the protected attribute added to the plaintext program stored in the instruction memory 123. The instruction memory access controlling unit 124 controls an external access to the instruction memory 123.

FIG. 4 is a schematic diagram of an access control rule of the instruction memory access controlling unit 124. As shown in FIG. 4, when the access request is an instruction fetch by the processor core 110 and the requested program has the protected attribute of protection, the access is permitted. On the other hand, when the access request is other than the instruction fetch by the processor core 110 and the requested program has the protected attribute of protection, the access is restricted, i.e., an error indication is supplied as an output. When the requested program has the protected attribute of non-protection, the access is permitted regardless of the type of request.

Thus, with the prohibition of the access by any types of request other than a particular type of request, an illegal reading of a plaintext program by a third party can be prevented. Further, when the access to the program with the protected attribute of protection is restricted, an illegal reading of a particular plaintext program can be prevented.

Figure 5:
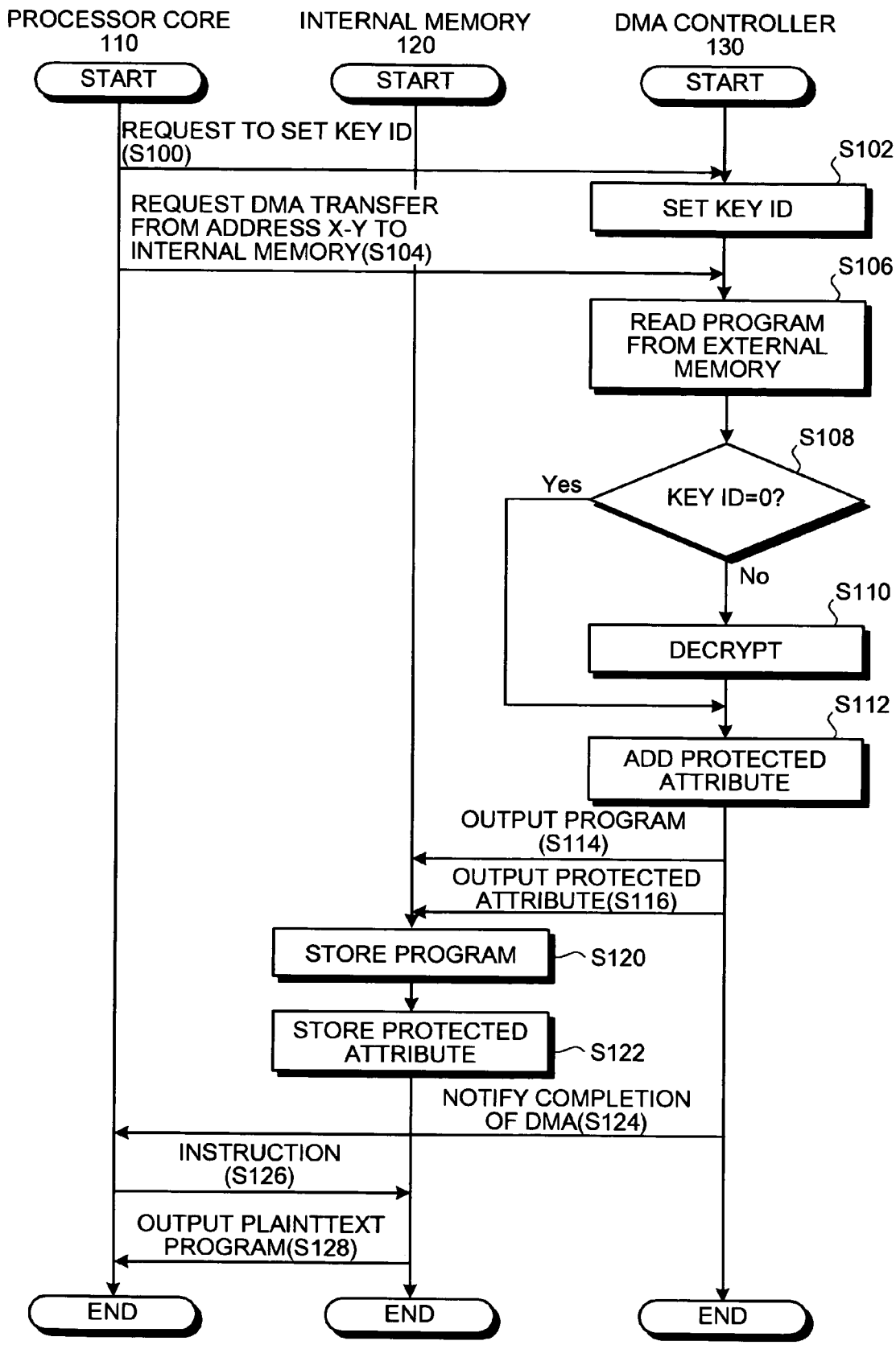
FIG. 5 is a flowchart of a reading process where a program stored in an external memory is written into an internal memory via a direct memory access (DMA) controller.

FIG. 5 is a flowchart of a writing process of a program stored in the external memory 200 to the internal memory 120 via the DMA controller 130.

First, the user stores the program to be executed by the processor core 110 in the external memory 200. Here, it is assumed that the programs are stored in addresses X to Y in the external memory 200. Further, prior to the program execution, a key ID is set in the key ID register 132 of the DMA controller 130 (step S100, step S102). Here, a cipher key is set according to an instruction by the user via the user interface 300.

The processor core 110 sends a DMA transfer request to the DMA controller 130 (step S104). Here, the DMA transfer request is information requesting a transfer of the data in addresses X to Y in the external memory 200 to the internal memory.

The DMA controller 130 reads out a program E2[C(X to Y)] corresponding to the addresses X to Y from the external memory 200 (step S106). Here, if the value set in the key ID register 132 is other than "0" (No in step S108), the encryption and decryption unit 134 decrypts the encrypted program E2[C(X to Y)] with the use of the key obtained from the key table 133, to obtain a plaintext program C(X to Y) (step S110).

When the value other than "0" is set in the key ID register 132, the pertinent program is encrypted. The decryption is performed to obtain the plaintext program.

On the other hand, when the value set in the key ID register 132 is "0" (Yes in step S108), the process sequence proceeds to step S112 described later without the decryption process.

When the value "0" is set in the key ID register 132, the corresponding program is a plaintext and decryption is not necessary.

Then, the protected attribute adding unit 135 adds a protected attribute to the plaintext program to be stored in the internal memory 120 based on the value set in the key ID register 132 (step S112). Specifically, when the value set in the key ID register 132 is "0," i.e., the program is acquired in the form of a plaintext, the protected attribute adding unit 135 adds the protected attribute "0" indicating non-protection.

On the other hand, when the value set in the key ID register 132 is a value other than "0," i.e., the program is acquired in an encrypted form, the protected attribute adding unit 135 adds the protected attribute "1" indicating protection.

Then, the encryption and decryption unit 134 sends the plaintext program to the internal memory (step S114). In addition, the protected attribute adding unit 135 sends the protected attribute added to the plaintext program to the internal memory 120 (step S116).

The internal memory 120 stores the plaintext program C(X to Y) which is the result of decryption sent from the DMA controller 130 in the instruction memory 123 (step S120). In addition, the internal memory 120 stores the protected attribute in the protected attribute memory 122 (step S122).

When the transfer of the plaintext program from the DMA controller 130 to the internal memory 120 is completed, the processor core 110 is notified of the completion of DMA transfer (step S124).

Then, the processor core 110 requests the reading out of the plaintext program by an instruction fetch (step S126). The internal memory 120, on receiving the read request, outputs the requested plaintext program to the processor core 110 (step S128).

With the above-described processing, the program is stored in the internal memory 120 and the processor core is ready to execute the program.

Figure 6:
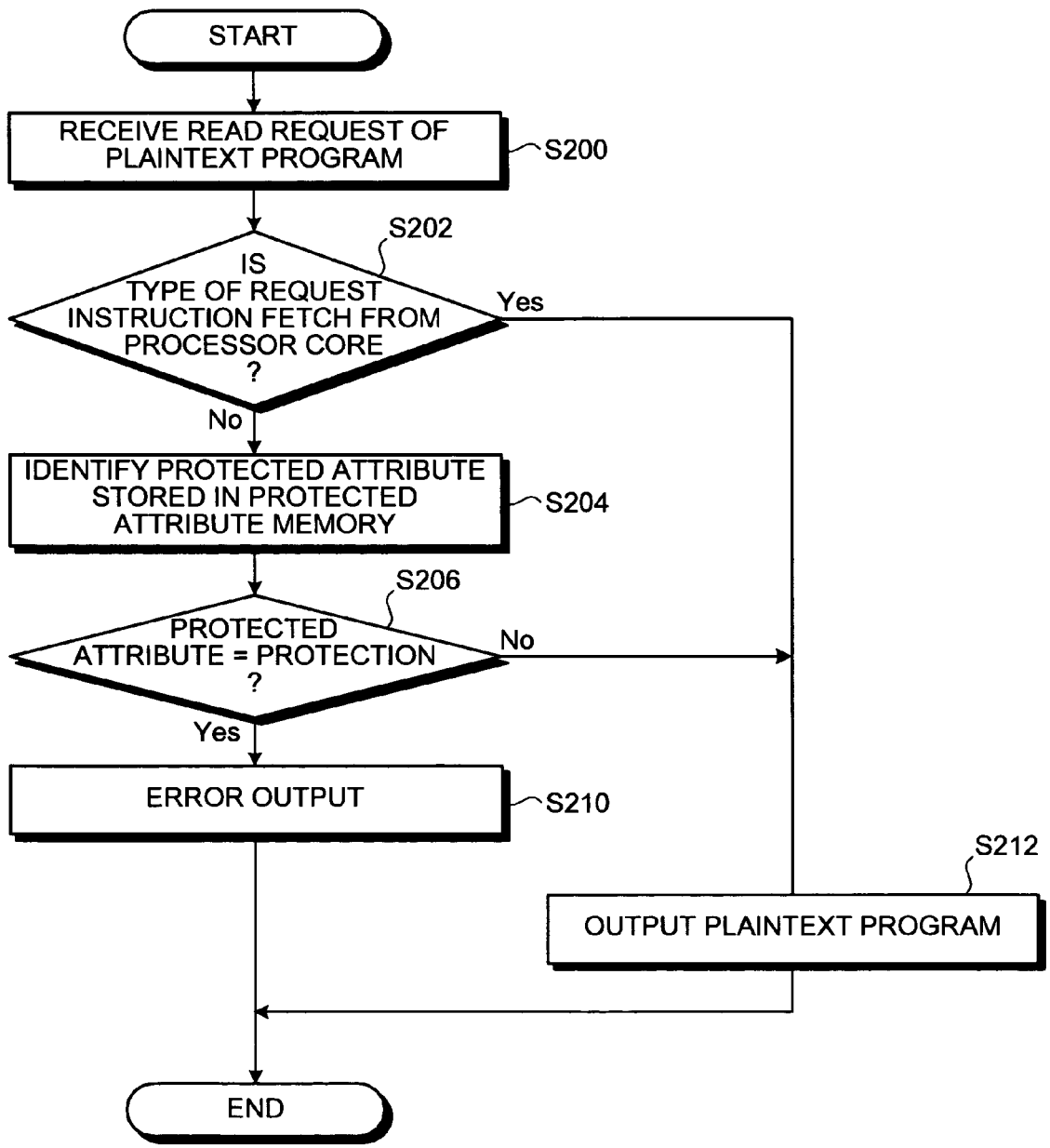
FIG. 6 is a flowchart of a reading process when a program stored in the internal memory is read out according to the process described with reference to FIG. 5.

FIG. 6 is a flowchart of a reading process where the program stored in the internal memory 120 according to the process described with reference to FIG. 5 is read out.

The instruction memory access controlling unit 124 of the internal memory 120, on receiving a request to read out the program stored in the instruction memory 123 (step S200), identifies whether the type of the read request is an instruction fetch by the processor core 110 or not. Specifically, the type of request can be identified depending on the physical wiring, for example. When the type of request is identified to be the instruction fetch by the processor core 110 (Yes in step S202), the instruction memory access controlling unit 124 outputs the plaintext program stored in the instruction memory 123 to the processor core 110 (step S212).

When the type of request is identified to be other than the instruction fetch by the processor core 110 (No in step S202), the encryption and decryption unit 134 identifies the protected attribute of the requested plaintext program (step S204).

When the requested plaintext program has the protected attribute indicating protection (Yes in step S206), the error indication is provided (step S210). On the other hand, when the requested plaintext program has the protected attribute indicating non-protection (No in step S206), the plaintext program is supplied as an output (step S212). Thus, the reading process is completed.

Next, a more specific description is given on a process where the processor core 110 sends a read request to the internal memory 120 as the instruction fetch. The instruction memory access controlling unit 124 in the internal memory 120, on determining that the request is the instruction fetch by the processor core 110, sends the plaintext program C(X to Y) read out from the instruction memory 123 to the processor core 110 following the rule described with reference to FIG. 4 (Yes in step S202, step S212). Then, the processor core 110 executes the acquired plaintext program.

When the type of request is not the instruction fetch by the processor core 110 (No in step S202) and the protected attribute thereof is "0" indicating non-protection (No in step S206), the plaintext program is supplied as an output (step S212).

When the type of request is not the instruction fetch by the processor core 110 (No in step S202), and the protected attribute thereof is "1" indicating protection (Yes in step S206), the error indication is provided (step S210).

Thus, the instruction memory access controlling unit 124 of the internal memory 120 restricts the reading out of the plaintext program when the request is of the type other than the instruction fetch by the processor core 110, whereby an illegal reading-out of the plaintext program by a third party can be prevented.

Here, the program stored in the external memory 200 in the encrypted form is likely to be a highly confidential program. Hence, a protected attribute indicating protection is added only to the stored encrypted program for the restriction of an access thereto. Thus, only the predetermined programs can be placed under the access restriction.

As can be seen from the above, when plural programs are read out from the external memory, protected programs which should be under the access restriction and non-protected programs for which the access restriction is not necessary might be present together in storages such as the internal memory 120. However, with the access control as described above, an effective access control can be realized so that only the protected programs are placed under the access restriction.

When the protected program and the non-protected program are present together, there can be a spatial mix and a temporal mix. The temporal mix is when a protected program is stored in the internal memory 120 at a certain time, and a non-protected program is stored in the internal memory 120 at another time.

The spatial mix is when a protected program is stored in an address 1000 of the instruction memory 123 whereas a non-protected program is stored in an address 5000 of the instruction memory 123.

The user may analyze software with the debugger 500 by sending a request to read out the plaintext program stored in the internal memory 120 from the debugger 500 via the debugger interface 140.

Then, however, the type of request is not the instruction fetch by the processor core 110. According to the reading process described with reference to FIG. 6, the reading out is restricted for the plaintext program with the protected attribute of protection. Hence, the instruction memory access controlling unit 124 provides an error indication to the debugger interface 140. Thus, the reading out of the plaintext program via the debugger 500 can be prevented.

In addition, the third party may try to illegally read out the plaintext program via the DMA controller 130. For example, if the debugger 500 sends a request of DMA transfer from the internal memory 120 to the external memory 200 to the DMA controller 130, specifying the key ID "0," such an illegal reading may be realized. The request of DMA transfer here is a request to transfer the program stored in the internal memory from an area inside the internal memory 120 to a suitable area in the external memory 200.

Then, the DMA controller 130 transfers the program from the internal memory 120 in response to the DMA transfer request from the debugger 500. Specifically, the DMA controller 130 reads out the program from the instruction memory 123 of the internal memory 120 and writes the same in the external memory 200.

Here, however, since the type of request is not the instruction fetch by the processor core 110, the reading is restricted for the program with the protected attribute of protection according to the reading process described with reference to FIG. 6. Then, the error indication is output.

The debugger 500 can access not only via the debugger interface 140 but also via the DMA controller 130 or the BIU 150. However, also in such accesses, the third party is prohibited from illegally reading out the program.

Figure 7:
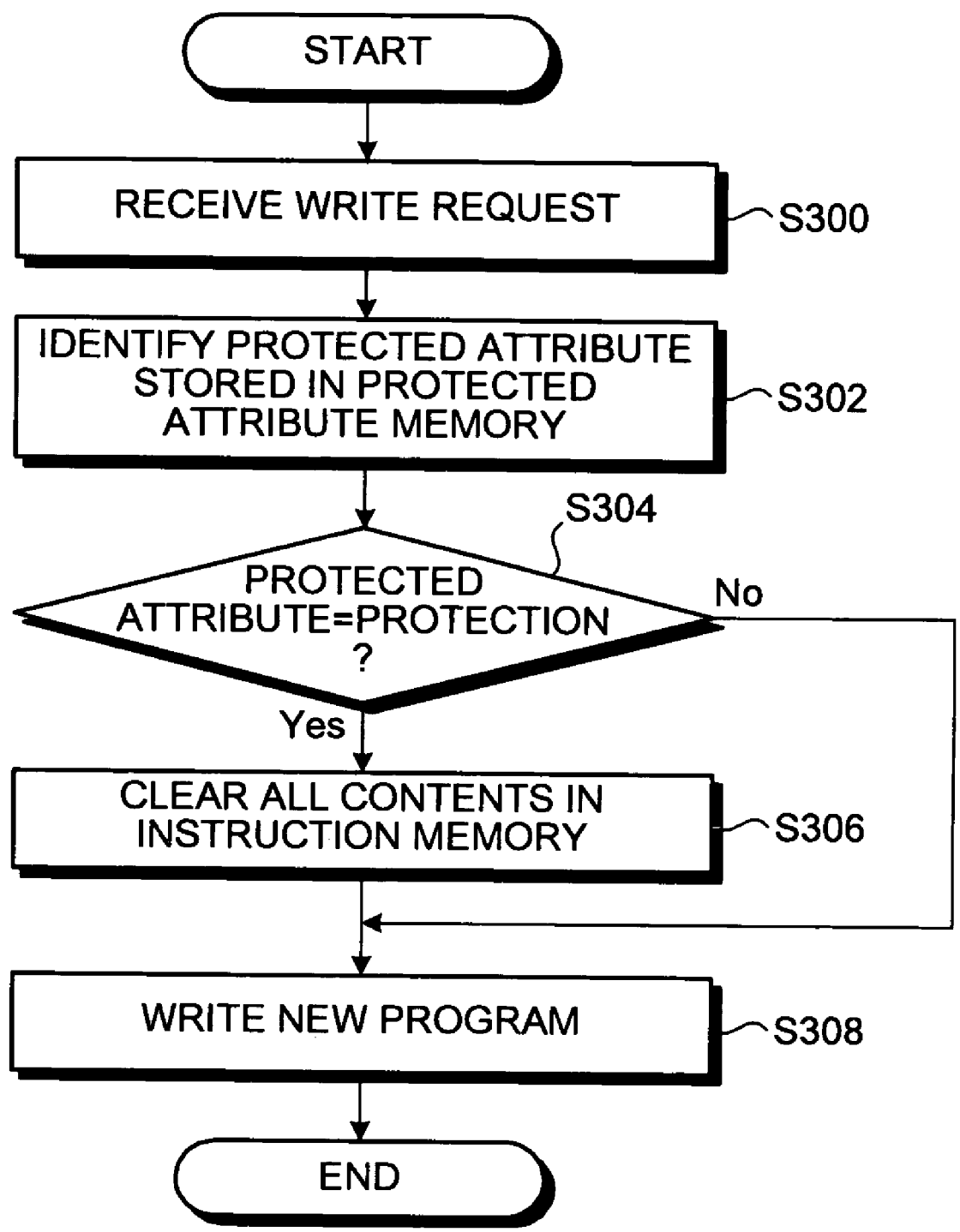
FIG. 7 is a flowchart of a writing process when a plaintext program is already stored in an instruction memory which is set to a debugger mode, and an instruction of further writing of a plaintext, i.e., an overwrite, is given.

FIG. 7 is a flowchart of a writing process where the plaintext program is already stored in the instruction memory 123 and the protected attribute of protection is added to the stored plaintext program, and a further writing, i.e., an overwrite, of a plaintext program is instructed.

On receiving a write request (step S300), the internal memory 120 identifies the protected attribute of the plaintext program already in the instruction memory 123 (step S302). When the plaintext program has the protected attribute "1" indicating protection (Yes in step S304), the internal memory 120 clears all contents of the instruction memory 123 which already stores the program (step S306), and stores the protected attribute indicating non-protection in the protected attribute memory. Then, the internal memory 120 writes a program identified by the write request into the instruction memory 123 (step S308).

On the other hand, when the plaintext program has the protected attribute "0" indicating non-protection (No in step S304), the process proceeds to step S308. The internal memory writes in a new plaintext program into the instruction memory 123 without clearing the contents of the instruction memory 123 (step S308). Thus the writing process finishes. The writing process in step S308 is similar to the writing process described with reference to FIG. 5.

When a partial overwrite to the already stored program is permitted, an access to other area where another program is already stored is also possible. Hence, reading out of such program becomes possible. Then, the third party may illegally read out a plaintext program utilizing this condition.

However, as already described with reference to FIG. 7, when the program which is already stored has the protected attribute indicating protection, the internal memory 120 clears all the program already in the instruction memory 123 before the program writing to the instruction memory 123 starts. The writing of a new plaintext program begins only after the all-clear. Thus, the program already in the instruction memory 123 cannot be illegally read out.

Though the present invention is described with reference to the embodiment above, various modifications or improvements are possible to the embodiment above.

A first example of modification is to simultaneously store plural plaintext programs in the instruction memory 123 and to perform access restriction on program-to-program basis. FIG. 8 is a schematic diagram of a data structure of the protected attribute memory 122 according to the first modification. As shown in FIG. 8, the protected attribute memory 122 stores protected attributes in association with program IDs which are used to identify each plaintext program.

According to the first modification, the instruction memory access controlling unit 124 restricts the access to the instruction memory 123 for each area where a plaintext program is stored based on the association defined in the protected attribute memory 122.

For example, assume that a read request is made for an area corresponding to a program ID "0001". As shown in FIG. 8, the plaintext program identified by the program ID "0001" has a protected attribute of protection. Hence, the instruction memory 123 restricts the access to the plaintext program identified by the program ID "0001." The instruction memory 123 does not restrict the access to a protected program identified by a program ID "0002."

More specifically, when the read request for the program ID "0001" is received, since the plaintext program identified by the program ID "0001" has the protected attribute of protection, the response is determined according to the reading process shown in FIG. 6, i.e., it is determined whether to output the plaintext program or the error indication.

On the other hand, when the read request for the program ID "0002" is received, since the plaintext program identified by the program ID "0002" has the protected attribute of non-protection, the plaintext program is output according to the reading process shown in FIG. 6.

When a write request for the program ID "0001" is received, since the plaintext program identified by the program ID "0001" has the protected attribute indicating protection, the plaintext program already stored in the memory is cleared prior to the writing of a new program into the area where the plaintext program is already stored according to the writing process shown in FIG. 7.

On the other hand, when a write request for the program ID "0002" is received, since the plaintext program identified by the program ID "0002" has a protected attribute indicating non-protection, a new program is written into an area where the plaintext program is already stored without the clear of the plaintext program already stored therein according to the writing process shown in FIG. 7.

Thus, even when the plaintext program with the protected attribute indicating protection and the plaintext program with the protected attribute indicating non-protection are stored at the same time, the access restriction can be performed only for the plaintext program with the protected attribute of protection. Hence, the third party is prohibited from illegally reading out a particular plaintext program.

In the first modification, the protected attribute memory 122 stores the program IDs and the protected attributes in association with each other. However, in a second modification, the protected attribute memory 122 may store a bank position in the instruction memory 123 and the protected attribute in association with each other.

FIG. 9 is a schematic diagram of a data structure of the protected attribute memory 122 according to the second modification. As shown in FIG. 9, the protected attribute memory 122 stores the bank positions in the instruction memory 123 and the protected attributes added to plaintext programs stored in respective bank positions in association with each other. In the second modification, the instruction memory access controlling unit 124 controls the access to the instruction memory 123 for each area where a program is stored based on the association of the bank position and the protected attribute.

For example, assume that the protected attribute indicating protection is associated with a bank 1, where a plaintext program identified by a program ID "0001" is stored. Then, the access to the plaintext program identified by the program ID "0001" is restricted. In addition, if the protected attribute indicating non-protection is associated with a bank 2, where a plaintext program identified by the program ID "0002" is stored, the access to the plaintext program identified by the program ID "0002" is permitted.

Thus, according to the second modification, even if the instruction memory 123 simultaneously stores plural programs, the third party can be prohibited from illegally reading out the plaintext program on bank-to-bank basis.

Figure 10:
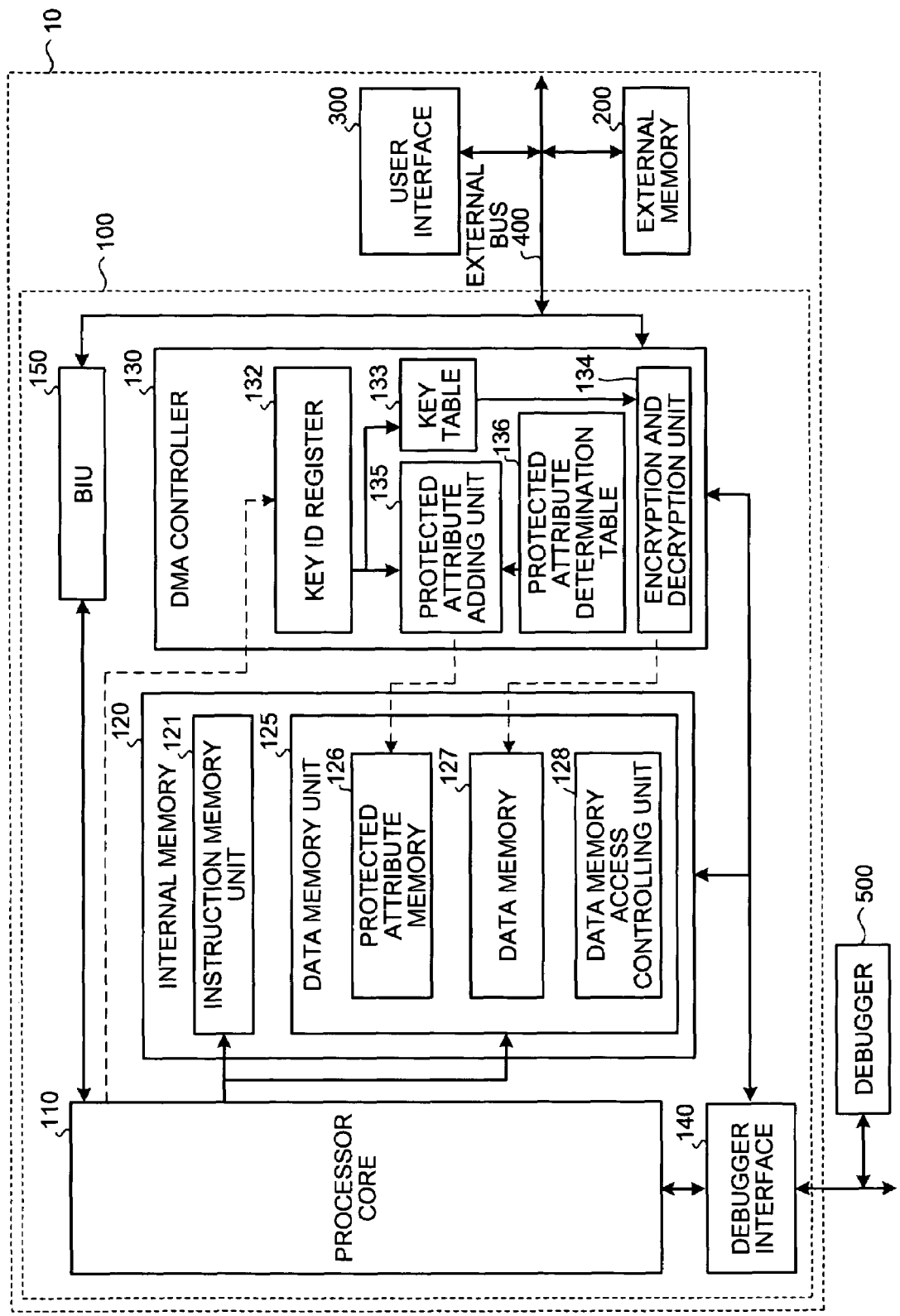
FIG. 10 is a diagram of an overall structure of a system according to a third modification of the first embodiment.

In the first modification the access to the program is controlled. In a third modification, an access to data is controlled. FIG. 10 is a diagram of an overall structure of a system 10 according to the third modification. A data memory unit 125 includes, similarly to the instruction memory unit 121, a protected attribute memory 126, a data memory 127, and a data memory access controlling unit 128.

Here, the structure and the process of the protected attribute memory 126 are same with those of the protected attribute memory 122. In addition, the structure and the process of the data memory 127 are same with those of the instruction memory 123. Still in addition, the structure and the process of the data memory access controlling unit 128 are same with those of the instruction memory access controlling unit 124.

Alternatively, the access control may be performed both for the program and the data. Thus, the target of the access control is not limited by the embodiment.

In the third modification where the access to data is controlled, in the writing process, it is determined whether to clear the already stored data before the data writing or not based on the protected attribute of the data as shown in FIG. 7. In a fourth modification, such determination is made based on an identity of a request sender besides the protected attribute.

Figure 11:
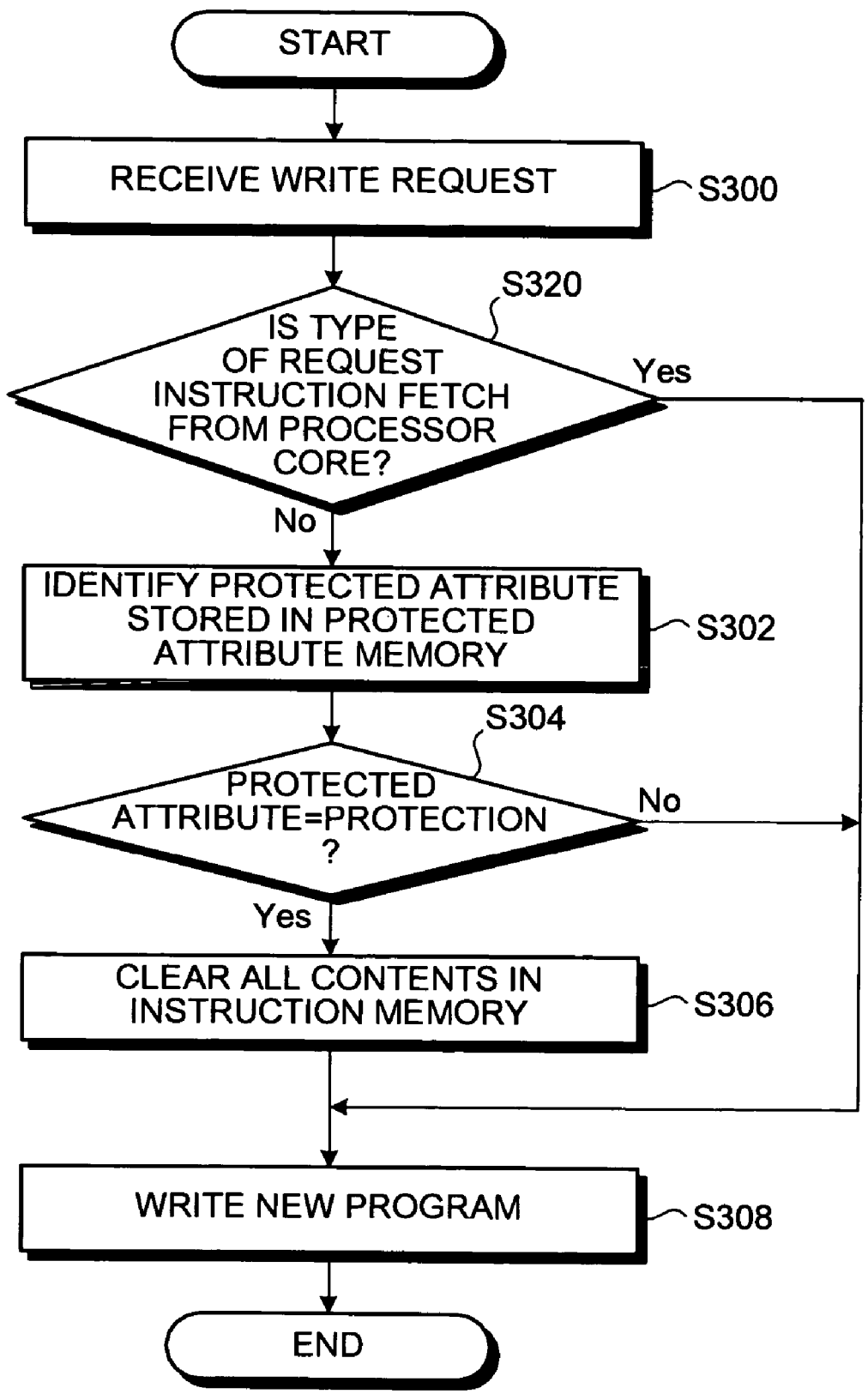
FIG. 11 is a flowchart of a writing process according to a fourth modification of the first embodiment.

FIG. 11 is a flowchart of a writing process according to the fourth modification. As shown in FIG. 11, in the writing process according to the fourth modification, when the type of the received write request is the write request from the processor core (Yes in step S320), the process proceeds to step S308. In other words, when the type of request is the write request from the processor core 110, a new plaintext program is written in without the clear process.

When the access is controlled based on the type of request, an effective access control can be performed for a predetermined type of request without restriction to the access of requests of other types.

In the first embodiment, when the read request is received for the plaintext program with the protected attribute of protection, the access control is performed so that the reading is prohibited. In a fifth modification, a program may be provided to the sender of the request in an encrypted form. When the access control is performed in this manner, the program is not read out in the plaintext form, whereby the third party is prohibited from illegally reading the plaintext program.

In the first embodiment, when a program is overwritten in an area where a plaintext program is already stored, it is determined whether to clear the already stored program or not prior to the overwriting according to the protected attribute of the program. In a sixth modification, the determination may be made according to an instruction from the user.

More specifically, in the access control for the plaintext program already stored, overwrite is prohibited in the area where a program with a protected attribute of protection is stored, and the plaintext program is cleared only when the instruction is given from the user to clear the stored plaintext program via the user interface 300, and otherwise an error indication may be output. Then, the writing is not allowed unless the program is cleared by the user, thus the plaintext program can be protected.

Next, a system 10 according to a second embodiment is described. The system 10 according to the second embodiment is different from the system 10 according to the first embodiment in that the system 10 according to the second embodiment controls access to the register or the like in the processor core 110.

Figure 12:
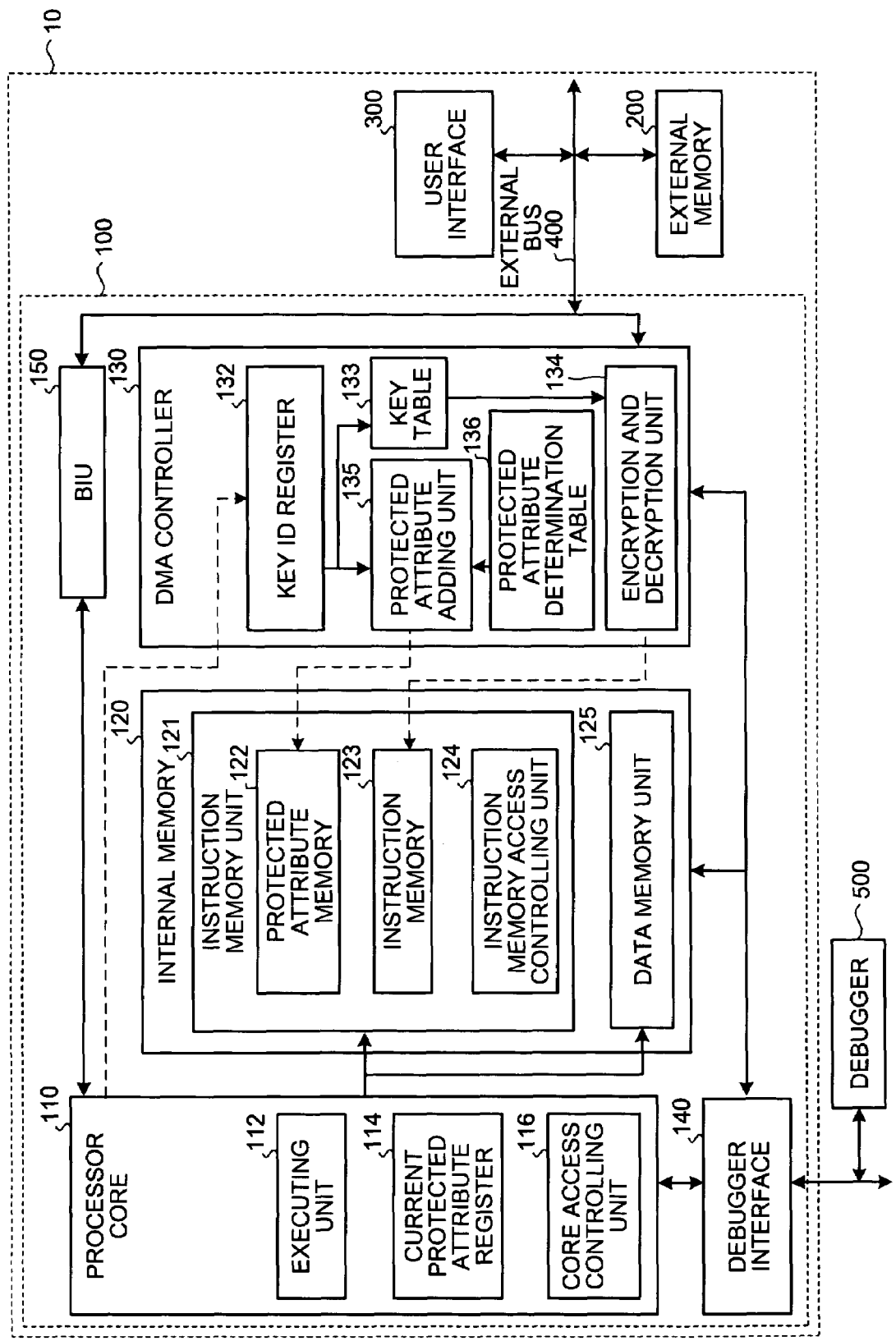
FIG. 12 is a diagram of an overall structure of a system according to a second embodiment.

FIG. 12 is a diagram of an overall structure of the system 10 according to the second embodiment. A processor core 110 of the system 10 according to the second embodiment includes an executing unit 112, a current protected attribute register 114, and a core access controlling unit 116.

The executing unit 112 executes the program. The current protected attribute register 114 stores the protected attribute of the program being executed by the executing unit 112. The core access controlling unit 116 controls the access to the program being executed by the processor core 110.

Figure 13:
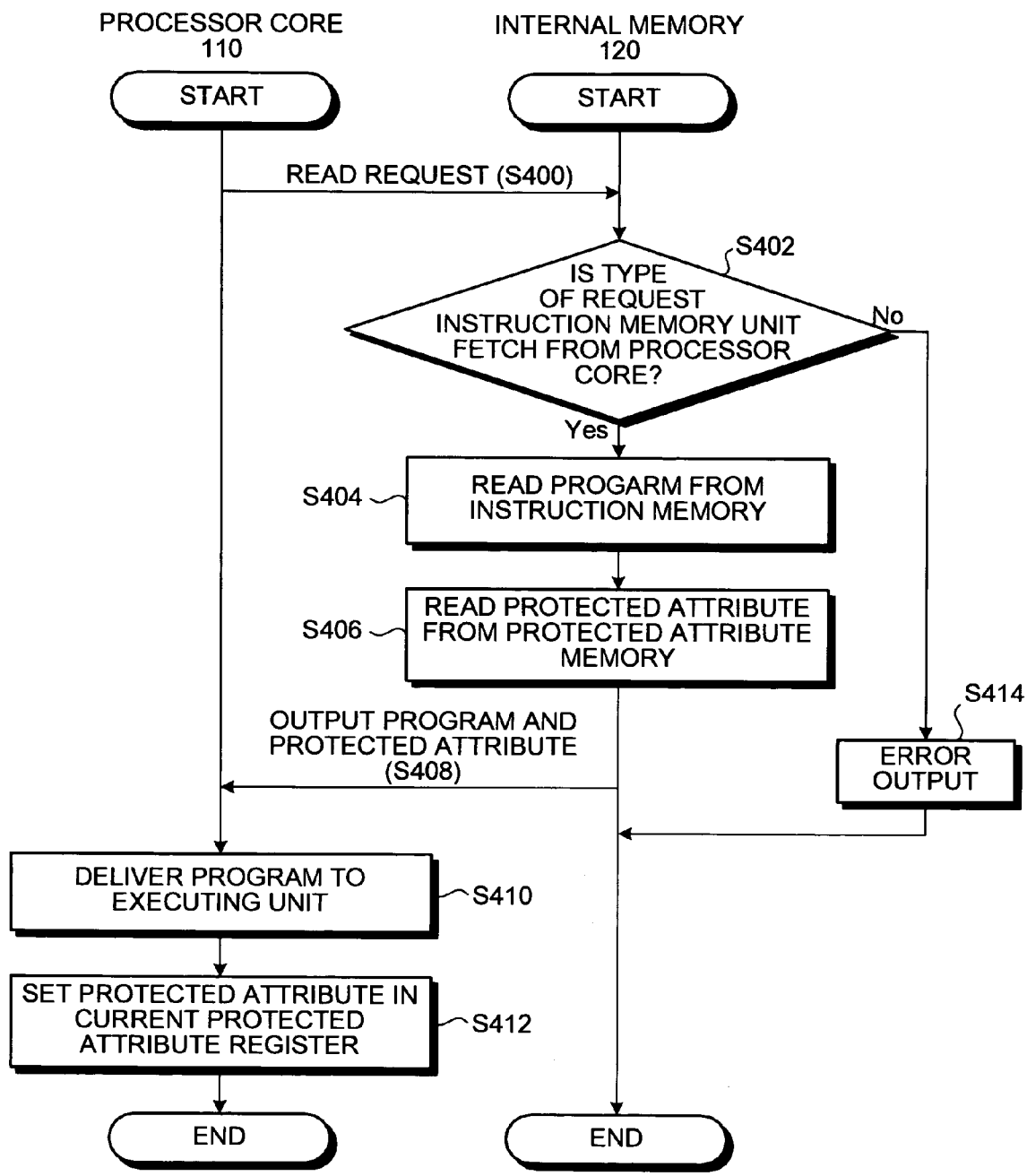
FIG. 13 is a flowchart of a process at program execution by a processor core in the system according to the second embodiment.

FIG. 13 is a flowchart of a process of program execution by the processor core 110 in the system 10 according to the second embodiment. With reference to FIG. 13, a process of program execution by the user is described. Here, the process to be performed until the program stored in the external memory 200 is stored in the instruction memory 123 of the internal memory 120 is same with the process described above with reference to FIG. 5 according to the first embodiment (steps S100 to S124).

When the executing unit 112 executes the program stored in the instruction memory 123, the processor core 110 first sends a request to read out the program from the internal memory 120 by the instruction fetch (step S400).

The instruction memory access controlling unit 124 of the internal memory 120 identifies the type of the read request. When the type of the request is the instruction fetch by the processor core 110 (Yes in step S402), the instruction memory access controlling unit 124 reads out the program (step S404). Further, the instruction memory access controlling unit 124 reads out the protected attribute added to the program from the protected attribute memory 122 (step S406).

Then, the instruction memory access controlling unit 124 sends the program and the protected attribute to the processor core 110 (step S408). Subsequently, the processor core 110 delivers the program acquired from the internal memory 120 to the executing unit 112 (step S410). Further, the protected attribute acquired from the internal memory 120 is stored in the current protected attribute register 114 (step S412). Here, when the type of request is not the instruction fetch by the processor core 110 in step S402 (No in step S402), the instruction memory 123 outputs an error indication (step S414).

Thus, the executing unit 112 is ready for program execution and the executing unit 112 starts executing the program.

The core access controlling unit 116 controls the access via the debugger interface 140 to values set in the register for the program being executed by the executing unit 112 according to the protected attribute stored in the current protected attribute register 114.

Figure 14:
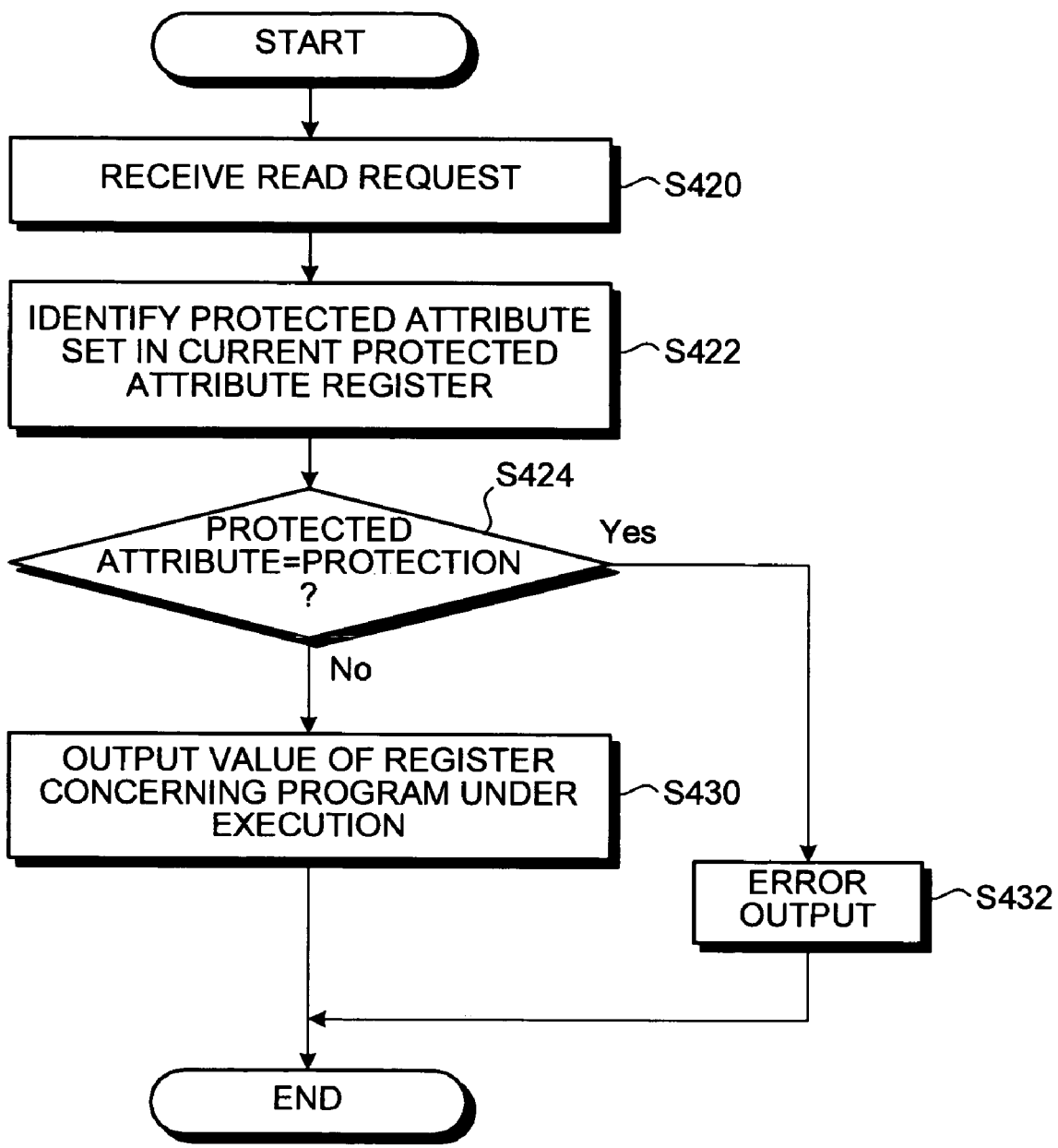
FIG. 14 is a flowchart of a process at software operation analysis.

Hereinbelow with reference to FIG. 14, a specific description is given on the access control for a process of software operation analysis. The core access controlling unit 116 receives from outside the system a read request of a value set in the register for the program being executed by the executing unit 112 (step S420). Then, the core access controlling unit 116 identifies the protected attribute stored in the current protected attribute register 114 (step S422).

When the current protected attribute register 114 stores a protected attribute indicating protection (Yes in step S424), the core access controlling unit 116 outputs an error indication to the debugger (step S432). On the other hand, when the current protected attribute register 114 stores a protected attribute indicating non-protection (No in step S424), the core access controlling unit 116 outputs the value set in the register concerning the program being executed by the executing unit 112 (step S430). Thus, the access control process completes.

When the debugger interface 140 sends a read request to the current protected attribute register 114 as described above, the core access controlling unit 116 outputs an error indication to the debugger interface 140 according to the process of access control. Hence, the program is protected from illegal reading via the debugger interface 140.

It should be noted that the structure and the process of the system 10 according to the second embodiment not particularly mentioned above are same with those of system 10 according to the first embodiment.

Figure 15:
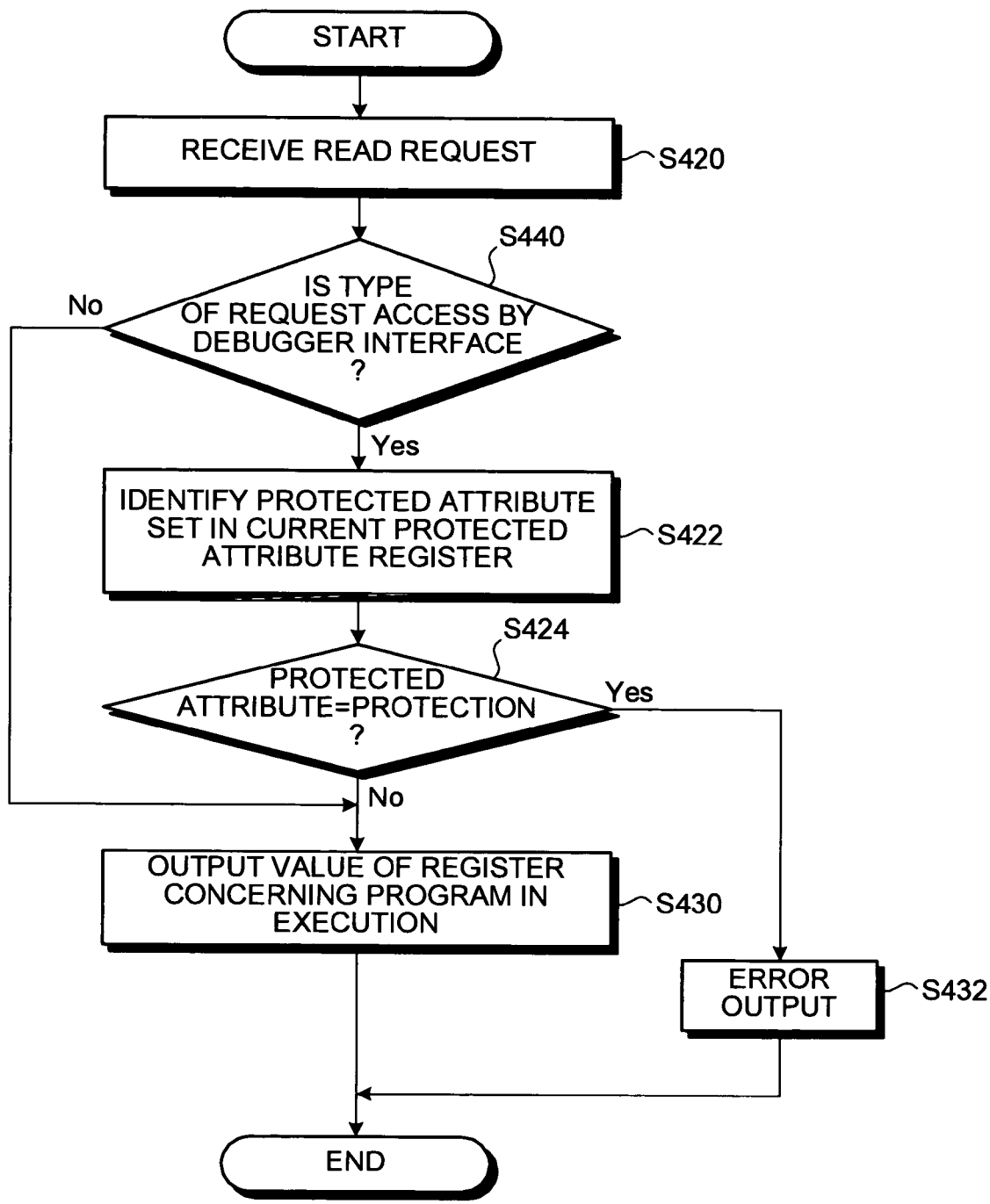
FIG. 15 is a flowchart of a reading process according to a modification of the second embodiment.

FIG. 15 is a flowchart of a reading process according to a modification of the second embodiment. As shown in FIG. 15, in the reading process according to the modification, when the type of the received read request is not an access via the debugger interface 140 (No in step S440), the process proceeds to step S430. In other words, when the type of the request is not the access via the debugger interface 140, the value of the register concerning the program in execution is output. With the access control based on the type of the request as described above, an effective control can be performed for a particular type of request without restriction to the access of requests of other types.

Figure 16:
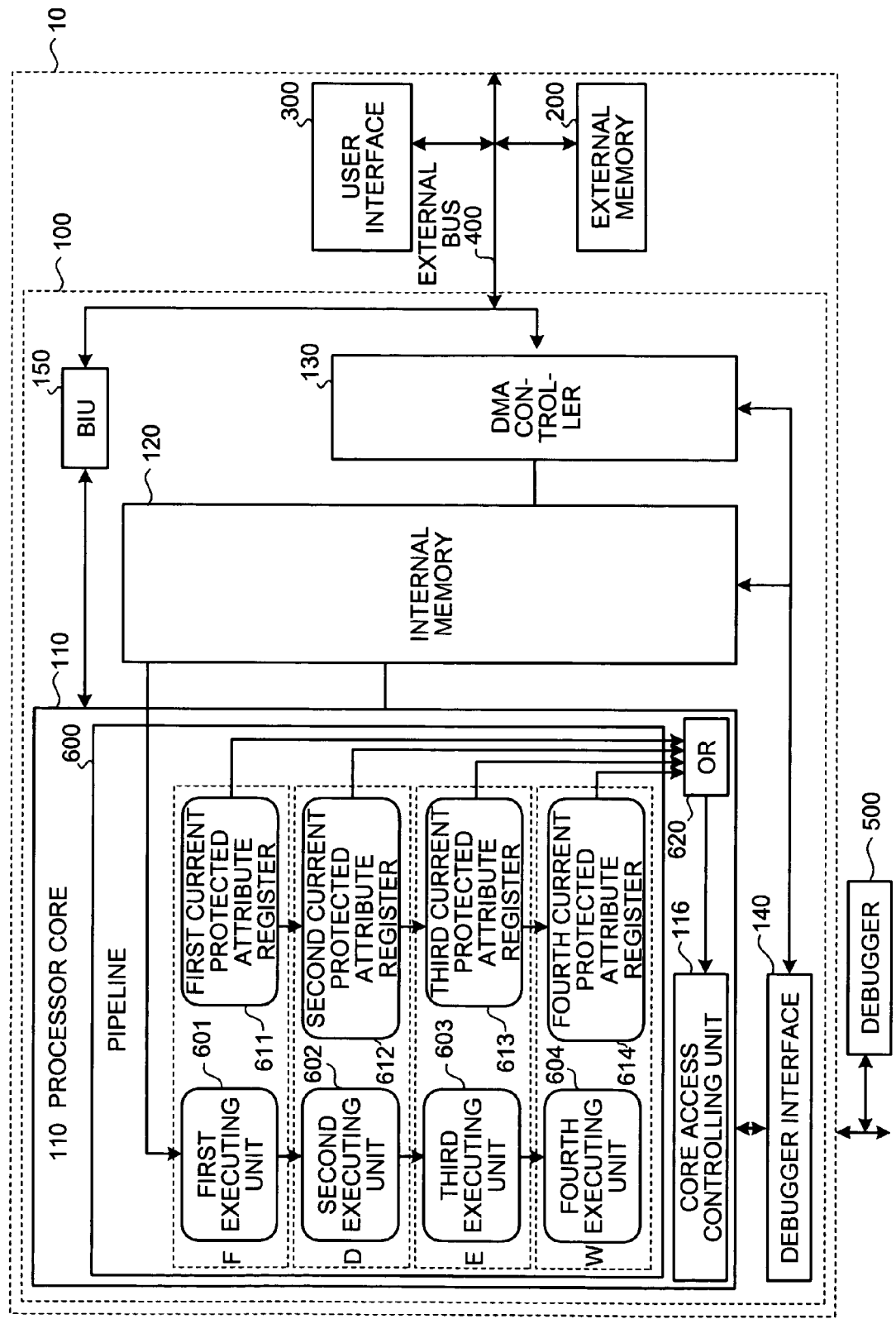
FIG. 16 is a diagram of an overall structure of a system 10 according to a third embodiment.

FIG. 16 is a diagram of an overall structure of a system 10 according to the third embodiment. A processor core 110 of the system 10 according to the third embodiment includes a pipeline 600, an OR circuit 620, and a core access controlling unit 116.

The processor core 110 according to the third embodiment includes an executing unit and a current protected attribute register for each stage of the pipeline. Current protected attribute registers 611-614 store protected attributes of the programs being executed by corresponding executing units 601-604, respectively. The OR circuit 620 performs an OR operation on plural protected attributes stored by each of the current protected attribute registers 611-614.

The core access controlling unit 116 controls the external access based on the protected attribute stored in each of the current protected attribute registers 611-614. Specifically, the core access controlling unit 116 restricts the external access when at least one of the plural protected attributes stored in each of the four current protected attribute registers 611-614 indicates the protection.

Thus, when the plural programs are simultaneously executed in the pipeline, and at least one of the programs in execution has the protected attribute indicating the protection, the core access controlling unit 116 restricts the external access, whereby the third party is prohibited from illegally reading out the plaintext program also in the pipeline processing.

The structure and the process other than specifically described above of the system 10 according to the third embodiment are same with the structure and the process of the system 10 according to the first embodiment.

As a first modification of the system 10 according to the third embodiment, the access may be controlled on stage-to-stage basis. The stage-based access control may be performed similarly to the first or the second modification of the first embodiment. According to such access control, only the access to the stage storing the program with the protected attribute indicating the protection can be restricted without the access restriction to the stages which execute the program having a protected attribute indicating the non-protection.

In the third embodiment, the pipeline has four stages. However, the number of the stages is not limited to the embodiment described above and may be larger or smaller than four in a second modification of the third embodiment.

Next, a system 10 according to a fourth embodiment is described. In the system 10 according to the fourth embodiment, the access to the instruction memory 123 is controlled based on the key ID. In this regard, the system 10 according to the fourth embodiment is different from the system in other embodiments.

Figure 17:
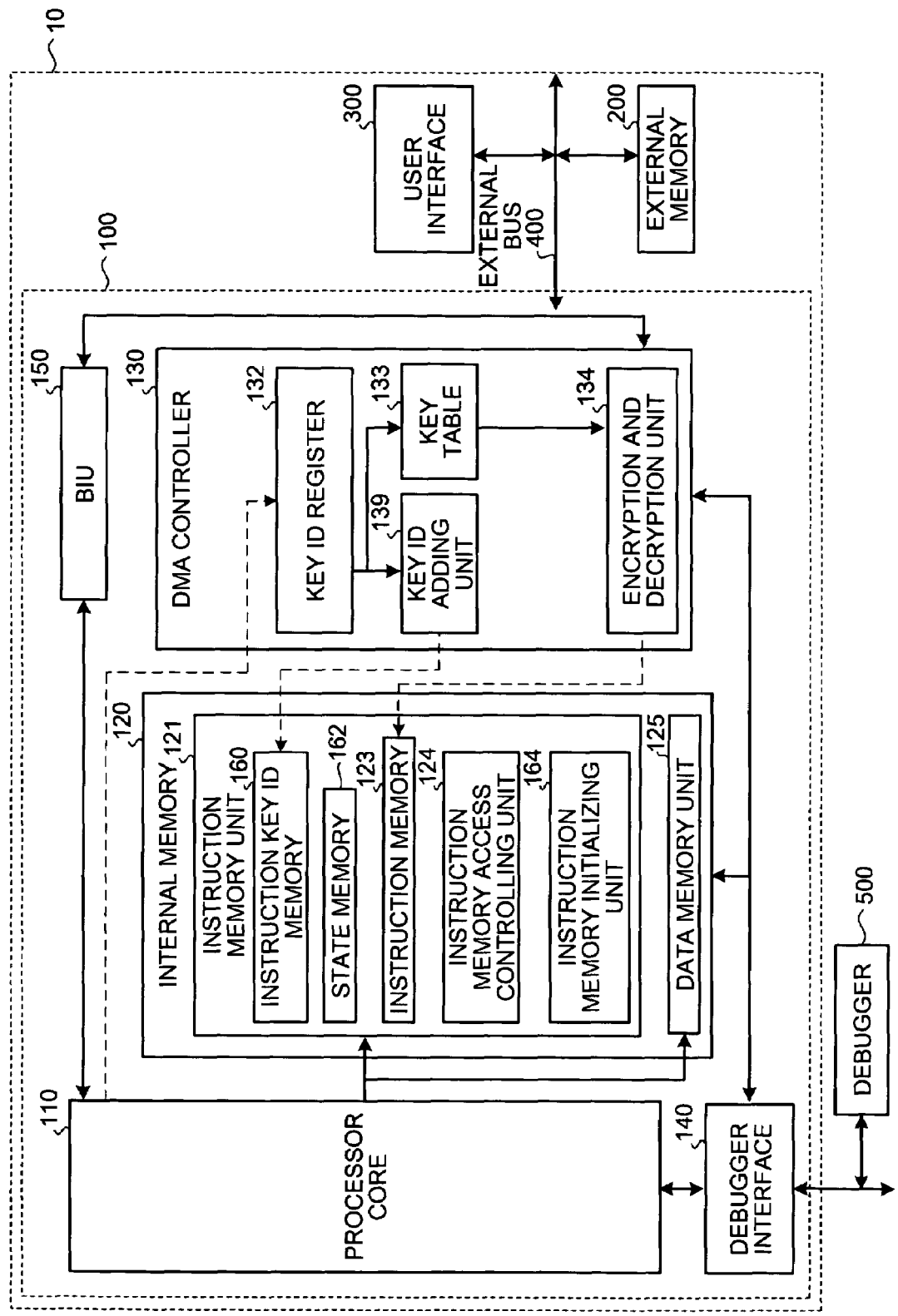
FIG. 17 is a diagram of an overall structure of a system 10 according to a fourth embodiment.

FIG. 17 is a diagram of an overall structure of the system 10 according to the fourth embodiment. A DMA controller 130 of the system 10 according to the fourth embodiment includes a key ID adding unit 139 in place of the protected attribute adding unit 135 and the protected attribute determination table 136.

The key ID adding unit 139 adds a key ID set in the key ID register 132 to a program acquired from the external memory 200. The key ID adding unit 139 stores the added key ID in the internal memory 120 in association with the program. Here, the key ID is also information indicating the protected attribute, i.e., protection or non-protection. Specifically, a key ID "0" corresponds to the protected attribute indicating non-protection. The key ID other than "0" corresponds to the protected attribute indicating protection. Thus, based on the key ID the protected attribute can be identified.

The instruction memory unit 121 includes an instruction memory 123, an instruction memory access controlling unit 124, an instruction key ID memory 160, a state memory 162, and an instruction memory initializing unit 164.

The instruction key ID memory 160 stores a key ID added to the plaintext program stored in the instruction memory 123.

Figure 18:
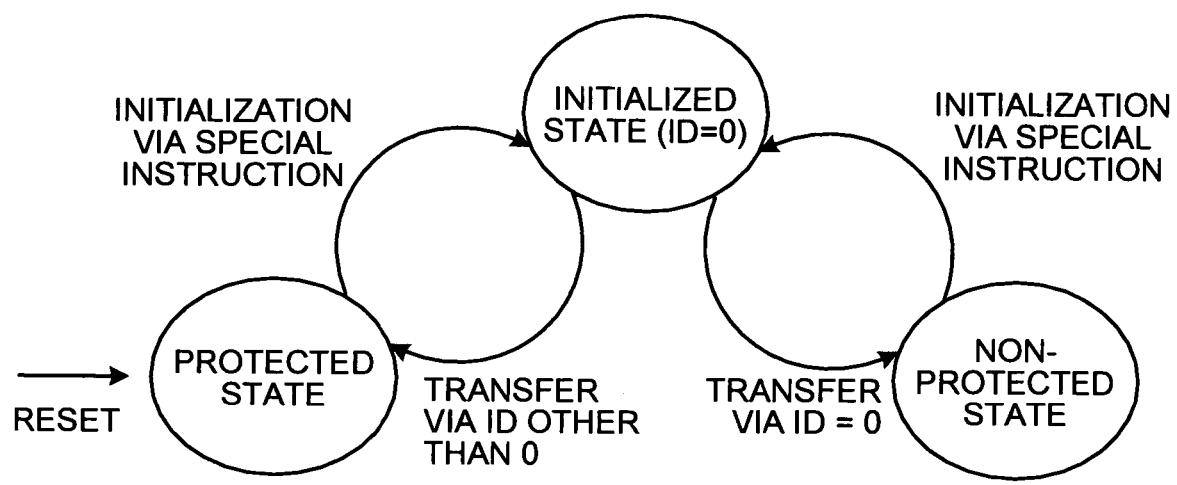
FIG. 18 is a state transition diagram of a plaintext program.

The state memory 162 stores a state of the plaintext program stored in the instruction memory 123. FIG. 18 is a state transition diagram of the plaintext program. As shown in FIG. 18, at the start-up of the processor 100, i.e., at the reset, the program is placed in a protected state. When a special instruction gives an instruction of initialization, the program transits to the initialized state. If some process is performed on the program with a key ID "0", i.e., the protected attribute indicating non-protection while the program is in the initialized state, the program transits to a non-protected state. On the other hand, if a process is performed on the program with a key ID other than "0", i.e., the protected attribute indicating protection while the program is in the initialized state, the program transits to the protected state.

When the processor 100 is reset while the protected program is stored in the internal memory 120, the state memory 162 of the internal memory 120 stores the protected state. Once the state is stored, the reading and the writing of the program with the protected attribute indicating protection cannot be done unless the stored state is initialized. Thus, the malicious third party is prohibited from illegally making an access.

A direct transition from the protected state to the non-protected state is not permitted. Hence, the malicious third party is also prohibited from partially overwriting the protected program thereby illegally performing the writing. Further a direct transition from the non-protected state to the protected state is not permitted either. Hence, the malicious third party is prohibited also from overwriting the protected program on a part of the non-protected program, and illegally executing the program.

Returning to FIG. 17, the instruction memory initializing unit 164 initializes the instruction memory 123 in response to the special instruction from the outside. Further, the instruction memory initializing unit 164 sets "0" to the key ID stored in the instruction key ID memory 160. Still further, the instruction memory initializing unit 164 changes the protected state stored by the state memory 162 into the initialized state.

FIG. 19 is a schematic diagram of an access control rule of the instruction memory access controlling unit 124 for the data reading. As shown in FIG. 19, when the instruction fetch by the processor core 110 is given and the key ID other than "0" is added to the requested program, the reading is permitted. Here, the program is in the protected state.

On the other hand, when the read access request is not the instruction fetch by the processor core 110 and the key ID other than "0" is added to the requested program, the reading is restricted, and the error indication is provided. Here, the program is in the protected state.

When the key ID "0" is added to the requested program, the reading is permitted regardless of the type of the request. Here, the state of the program is one of the initialized state and the non-protected state. Otherwise, the error indication is provided.

Thus, in the system 10 according to the fourth embodiment, the data reading from the instruction memory 123 can be controlled based on the key ID. Further, since the protected attribute can be identified by the key ID, the access to the program with the protected attribute indicating protection can be restricted similarly to the system 10 according to the first embodiment. In other words, the illegal reading of a particular plaintext program can be prohibited.

In addition, with the access restriction to the requests of other types than a particular type, the illegal reading of a plaintext program by the third party can be prohibited.

FIG. 20 is a schematic diagram of an access control rule for the data writing in the instruction memory access controlling unit 124. As shown in FIG. 20, when the program is in the initialized state and the key ID is "0," the writing is permitted regardless of the value of the key ID acquired from the access request sender. When the requested program has the key ID "0," the program is in the non-protected state, and if the key ID acquired from the access request sender is "0," the writing is permitted. When the requested program has the key ID "0," the program is in the non-protected state, and if the key ID acquired from the access request sender is not "0," the writing is restricted, i.e., the error indication is given.

When the requested program has the key ID other than "0" and the key ID acquired from the access request sender is "0," the error indication is supplied. When the requested program has the key ID other than "0" and the key ID acquired from the access request sender has the same value as the program's key ID, the writing is permitted. When the requested program has the key ID other than "0" and the key ID acquired from the access request sender has a different value from the program's key ID, the error indication is given. In other cases, the error indication is given.

Thus, when the key ID of the target program of the access request, and the key ID acquired from the access request sender do not match with each other, the access can be restricted, so that the third party is prohibited from partially and illegally overwriting and altering the plaintext program. Further, the program can be partially transferred. Still further, with the access restriction to the program with the protected attribute indicating the protection, the illegal overwriting and altering of a particular plaintext program can be prevented.

Further, since the writing is permitted only when the key ID acquired from the request sender and the key ID stored in the instruction key ID memory 160 match with each other and if the added key ID is not "0," the third party is prohibited from illegally overwriting and altering the plaintext program.

Figure 21:
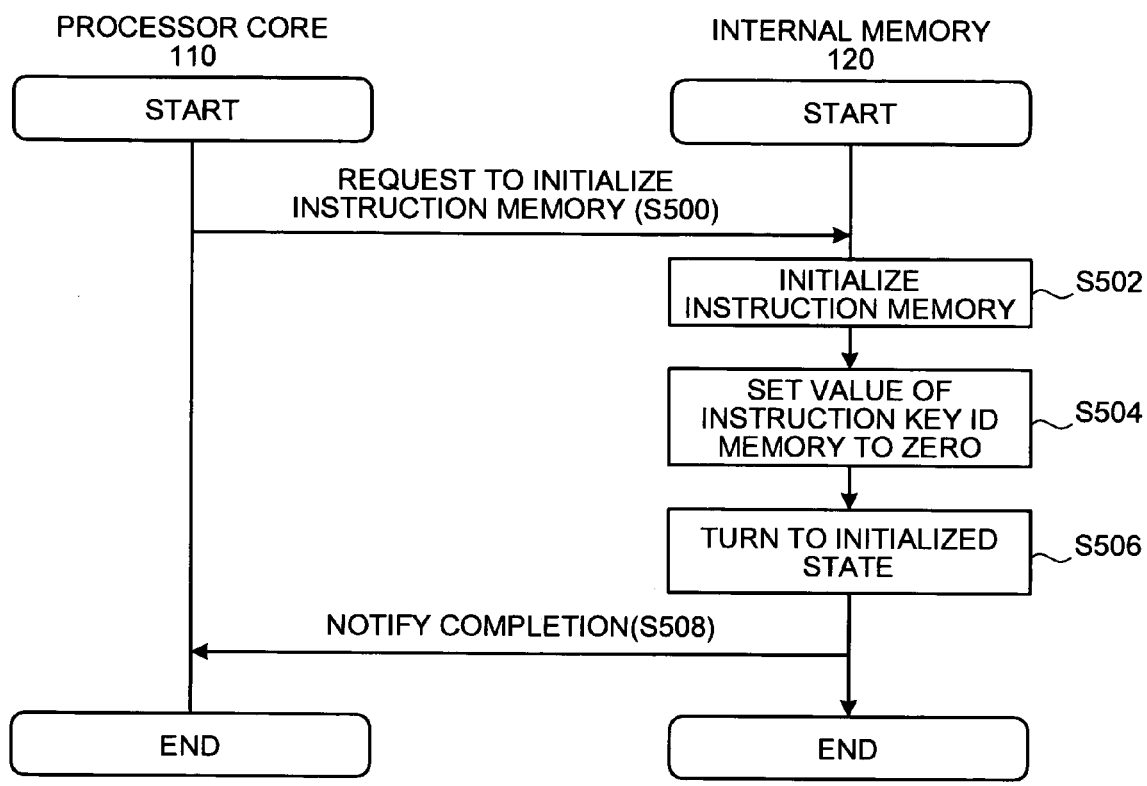
FIG. 21 is a flowchart of a process at initialization by a special instruction.

FIG. 21 is a flowchart of an initialization process by the special instruction. When the user sends instruction to initialize, the processor core 110 sends a request to initialize the instruction memory to the internal memory 120 (step S500). The internal memory 120, on receiving the instruction memory initialization request, initializes the internal memory 120. Specifically, the internal memory 120 initializes the instruction memory 123 (step S502). Further, the internal memory 120 changes the value of the key ID stored in the instruction key ID memory 160 to "0" (step S504). Further, the internal memory 120 changes the state stored in the state memory 162 to the initialized state (step S506). When the process up to step S506 is completed, the internal memory 120 sends a notice of completion to the processor core 110 (step S508). Thus, the initialization process completes.

With the initialization process, the internal memory 120 in one of the protected state and the non-protected state can be turned to the initialized state. In the initialized state, the value of the key ID stored in the instruction key ID memory 160 is "0". In other words, in the initialized state, the protected attribute indicates non-protection.

Figure 22:
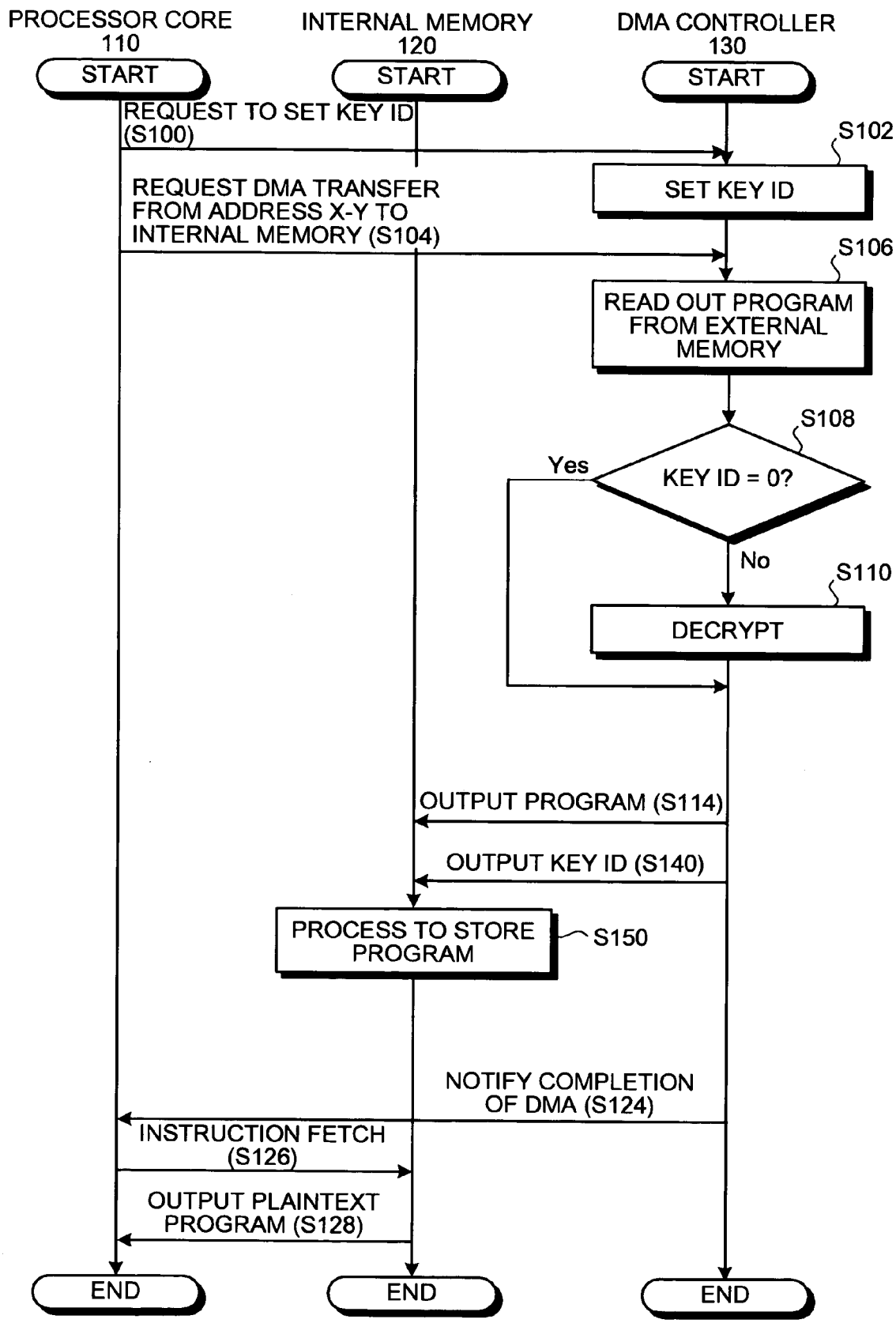
FIG. 22 is a flowchart of a writing process where a program stored in the external memory is written into the internal memory via the DMA controller.

FIG. 22 is a flowchart of the writing process where the program stored in the external memory 200 is written into the internal memory 120 via the DMA controller 130. Here, the program is assumed to be stored in the addresses X to Y in the external memory 200. The process from step S100 to step S110 in FIG. 22 is same with the process from step S100 to step S110 in the system 10 according to the first embodiment.

In the system 10 according to the fourth embodiment, after the decryption process (step S110), the program and the key ID are supplied as outputs (step S114 and step S140), followed by a process of storing the program (step S150). In other respects, the writing process of FIG. 22 is same with the writing process according to the first embodiment.

Figure 23:
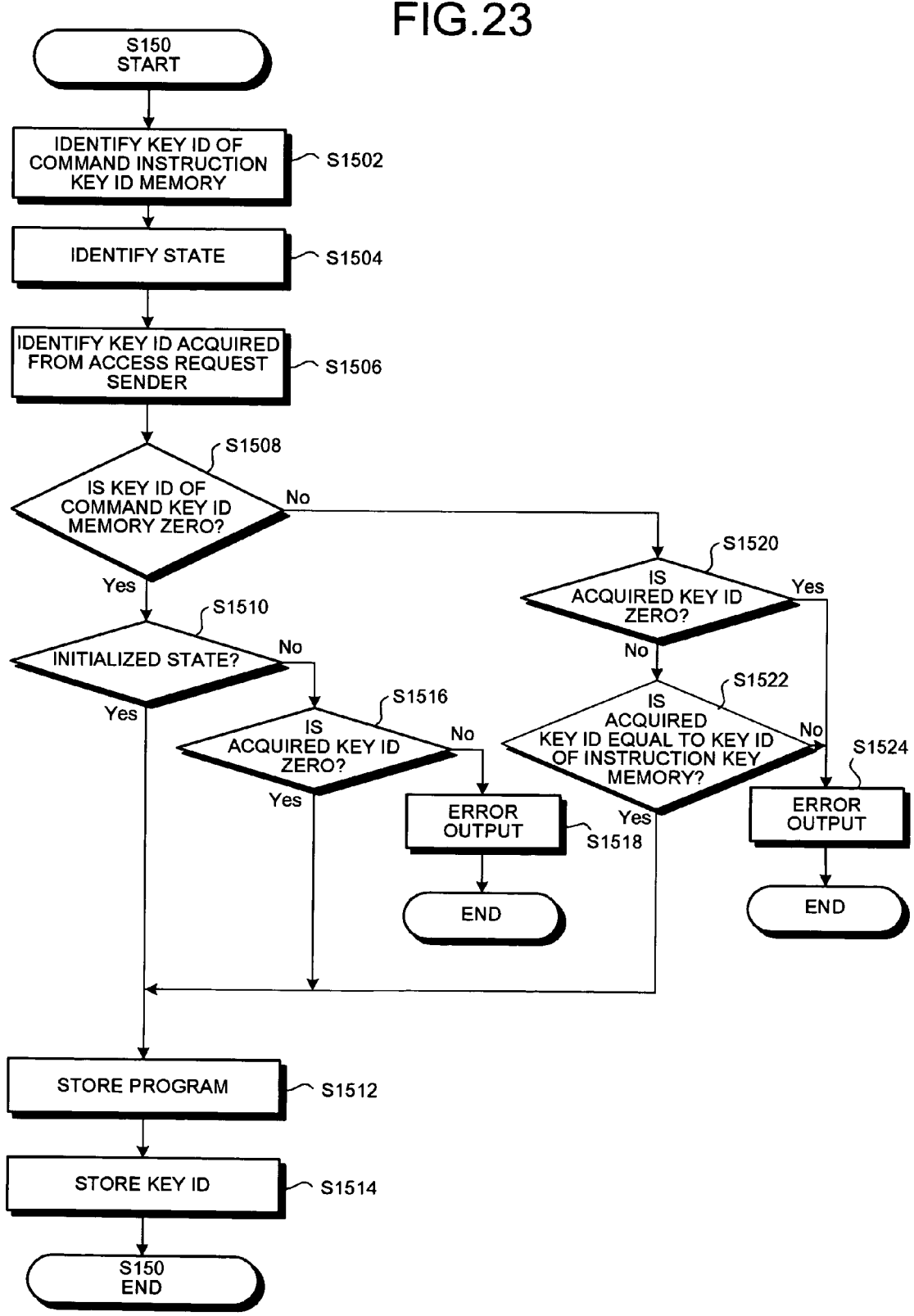
FIG. 23 is a flowchart of a process by the internal memory in a program retaining process in detail.

FIG. 23 is a flowchart of a detailed process in the internal memory 120 in the program storing process (step S150). The instruction memory access controlling unit 124, after acquiring the plaintext program and the key ID in steps S114 and S140, identifies the key ID stored in the instruction key ID memory 160 (Step S1502). Further, the instruction memory access controlling unit 124 identifies the state stored in the state memory 162 (step S1504) and the key ID acquired from the access request sender (step S1506).

Then, the instruction memory access controlling unit 124 stores the program in the instruction memory 123 only when the writing is permitted according to the rule of FIG. 20 (step S1512). Further, the key ID is stored in the instruction key ID memory 160 (step S1514).

Specifically, the program is stored when the key ID in the instruction key ID memory 160 is "0" and the state is the initialized state (Yes in step S1508 and Yes in step S1510); when the key ID in the instruction key ID memory 160 is "0," the state is the non-protected state, and the key ID acquired from the access request sender is "0" (Yes in step S1508, No in step S1510, Yes in step S1516); or when the key ID in the instruction key ID memory 160 is not "0," the key ID acquired from the access request sender is "0" and the acquired key ID and the key ID stored in the instruction key ID memory 160 are of the same value (No in step S1508, No in step S1520, Yes in step S1522).

Otherwise, the error indication is supplied as an output, i.e., when the key ID in the instruction key ID memory 160 is "0," the state is the non-protected state, and the key ID acquired from the access request sender is not "0" (Yes in step S1508, No in step S1510, No in step S1516); when the key ID in the instruction key ID memory 160 is not "0," and the key ID acquired from the access request sender is not "0" (No in step S1508, Yes in step S1520); or when the key ID in the instruction key ID memory 160 is not "0," the key ID acquired from the access request sender is not "0" and the acquired key ID and the key ID in the instruction key ID memory 160 are of different values (No in step S1508, No in step S1520, No in step S1522).

Figure 24:
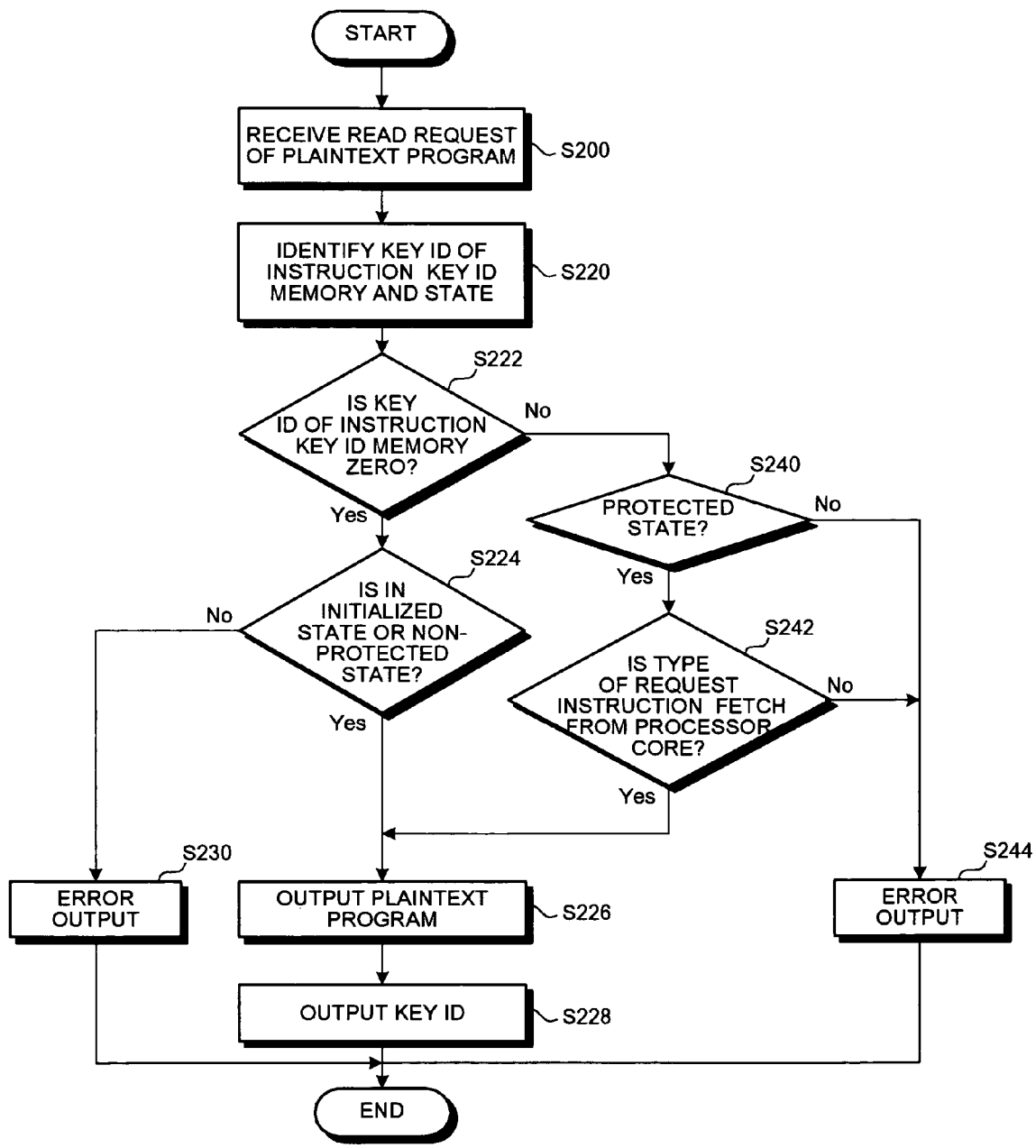
FIG. 24 is a flowchart of a reading process where a program stored in the internal memory is read out.

FIG. 24 is a flowchart of the reading process where the program stored in the internal memory 120 is read out. When the read request for the plaintext program is received (step S200), the key ID in the instruction key ID memory 160 and the state of the program are identified (step S220). Then, the program is read out only when the reading is permitted according to the rule described with reference to FIG. 19 (step S226). Further, the key ID and the state are read out (step S228).

Specifically, the instruction memory access controller 124 outputs the plaintext program stored in the instruction memory 123 (step S226), when the identified ID, i.e., the key ID in the instruction key ID memory 160 is "0" and the state is the initialized state or the non-protected state (Yes in step S222, Yes in step S224). Further, the instruction memory access controller 124 outputs the key ID (step S228).

In addition, the instruction memory access controlling unit 124 outputs the plaintext program and the key ID, when the key ID in the instruction key ID memory 160 is not "0," the state is the protected state, and the type of the request is the instruction fetch from the processor core 110 (No in step S222, Yes in step S240, Yes in step S242).

For the combinations other than those described above, the error indication is supplied as an output. For example, when the key ID in the instruction key ID memory 160 is "0" and the state is the protected state (Yes in step S222, No in step S224); when the key ID in the instruction key ID memory 160 is not "0" and the state is not the protected state (No in step S222, No in step S240); when the key ID in the instruction key ID memory 160 is not "0," the state is not the protected state, and the request is not the instruction fetch from the processor core 110 (No in step S222, Yes in step S240, No in step S242), the error indication is supplied as an output (step S230, step S244).

In the system 10 according to the fourth embodiment, since the protected attribute can be identified based on the key ID, the program reading can be restricted based on the protected attribute and the type of request similarly to the system 10 according to other embodiments. Thus, the third party is prohibited from illegal access.

The structure and the process of the system 10 according to the fourth embodiment not specifically described above are same with the structure and the process of the system 10 according to other embodiments.

Further, though in the system 10 according to the fourth embodiment, the key ID is utilized as information for the identification of the protected attribute, any other information can be utilized for the same purpose as far as it allows identification of the protected attribute and the program. For example, the value of the cipher key is may be utilized.

Next, a system 10 according to a fifth embodiment is described. The system 10 according to the fifth embodiment restricts debug interruption to the processor core 110, and also the output of trace information from the processor core 110. In this regards, the system according to the fifth embodiment is different from the systems according to other embodiments.

Figure 25:
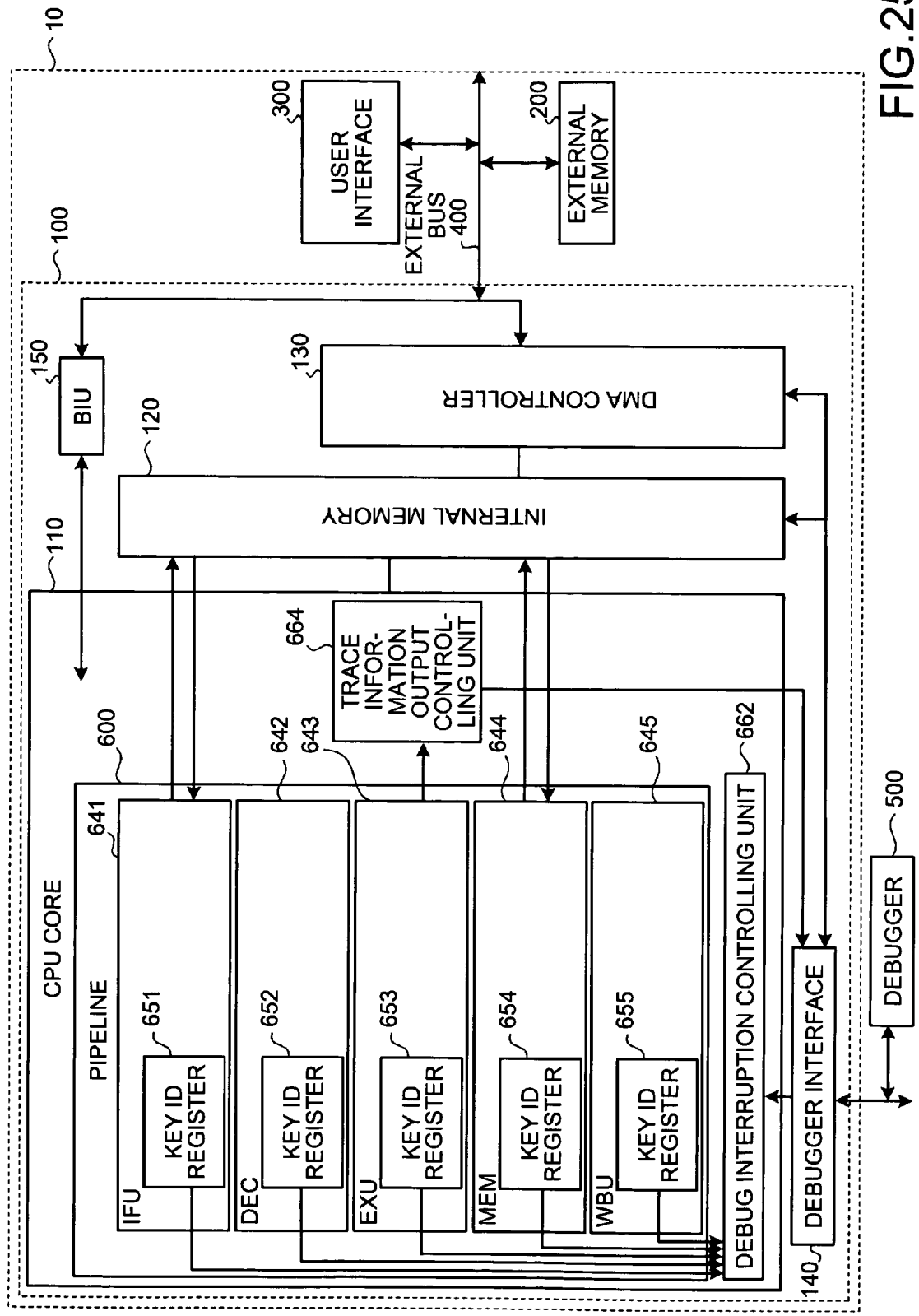
FIG. 25 is a diagram of an overall structure of a system 10 according to a fifth embodiment.

FIG. 25 is a diagram of an overall structure of the system 10 according to the fifth embodiment. The system 10 according to the fifth embodiment includes a pipeline 600, a debug interruption controlling unit 662, and a trace information output controlling unit 664.

The processor (CPU) core 110 includes key ID registers 651-655 for stages 641-645 of the pipeline, respectively. Each of the key ID registers 651-655 stores the key ID utilized by the instruction executed at the corresponding stage of the stages 651-655.

The debug interruption controlling unit 662 restricts the debug interruption from outside based on the key ID stored by each of the key ID registers 651-655. The debug interruption controlling unit 662 according to the fifth embodiment corresponds to a debug request acquiring unit and a debug interruption controlling unit recited in the appended claims. The trace information output controlling unit 664 restricts the trace information output to the debugger interface 140 based on the key ID stored in the key ID register 653 of the executing unit 643. The executing unit according to the fifth embodiment corresponds to an executing unit recited in the appended claims.

The debugger interface 140 is connected to the debugger 500 outside the system 10, and sorts the requests from the debugger 500 to the processor core 110, the internal memory 120, the DMA controller 130 or the like. Further, the debugger interface 140, on receiving the result of execution from respective unit and the trace information or the like from respective unit in response to the request, sends back the result of execution to the debugger 500.

FIG. 26 is a flowchart of the process where the processor core 110 of the system 10 according to the fifth embodiment executes the program. The process of the program execution by the user is described with reference to FIG. 26.

When the program stored in the instruction memory 123 is to be executed, an instruction fetch unit 641 in the pipeline 600 sends a read request of the program in the internal memory 120 as an instruction fetch (step S600).

The instruction memory access controlling unit 124 in the internal memory 120, on receiving the read request for the program, identifies the type of the read request. When the read request is the instruction fetch by the processor core 110 (Yes in step S602), the instruction memory access controlling unit 124 reads out the program (step S604). Further, the instruction memory access controlling unit 124 reads out the key ID added to the program from the instruction key ID memory 160 (step S606).

Subsequently, the instruction memory access controlling unit 124 sends the program and the key ID to the instruction fetch unit 641 in the pipeline 600 (step S608). When the type of the request is not the instruction fetch by the processor core 110 (No in step S602), the error indication is supplied as an output (step S610).

The instruction fetch unit 641, on receiving the program and the key ID from the internal memory 120, stores the acquired key ID in the key ID register 651 (step S612). The instruction fetch unit 641 sends the acquired program and the value in the key ID register 651 to the decode unit 642 (step S614).

The DEC 642 stores the key ID acquired from the instruction fetch unit 641 in the key ID register 652 (step S616). Further, the DEC 642, after decode (step S618), sends the result of decode and the value in the key ID register 652 to the executing unit 643 (Step S620).

The executing unit 643 stores the key ID acquired from the DEC 642 in the key ID register 653 (step S622). The executing unit 643 executes the instruction based on the result of decode (step S624) and thereafter sends the result of execution and the value in the key ID register 653 to the memory access unit 644 (step S626).

The memory access unit 644 stores the key ID acquired from the executing unit 643 in the key ID register 654 (step S628). The memory access unit 644, following the result, accesses the internal memory 120 (step S630) and thereafter sends the result and the value in the memory access unit 644 to the writeback unit 645 (step S632).

The writeback unit 645 stores the key ID acquired from the memory access unit 644 in the key ID register 655 (step S634). The writeback unit 645 performs writing to the register according to the result of memory access (step S636). Thus, the program execution is completed.

FIG. 27 is a flowchart of a debugger interruption process where the debug interruption is made to the processor core 110. The debug interruption controlling unit 662, on receiving a debugger interruption request, which is an interruption request from the debugger 500 (step S700), identifies the key IDs stored in the key ID registers 651-655 of respective stages in the pipeline 600 (step S702). When all of the key IDs in respective stages are "0", in other words, all stages show the protected attribute of the non-protection (Yes in step S704), the debug interruption request is accepted and the system is switched into the debug mode (step S706). Thus, the processor core 110 is ready to operate in the debug mode, whereby the step execution and debug with set breakpoints can be conducted.

On the other hand, when at least one of the key IDs of respective stages identified in step S702 is not "0", in other words, when at least one stage shows the protected attribute of the protection (No in step S704), the debugger interruption request is ignored and the error indication is supplied as an output (step S708). Thus, the debugger interruption process is completed.

Thus, the debugger interruption is permitted only when all the stages show the protected attribute of the non-protection, whereby the third party is prohibited from illegal access.

FIG. 28 is a flowchart of the trace information output process where the processor core 110 outputs the trace information. The trace information output controlling unit 664, on acquiring the trace information from the executing unit 643 (step S720), identifies the key ID stored in the key ID register 653 (step S722). When the identified key ID is "0", i.e., when the identified key ID shows the protected attribute of the non-protection (Yes in step S724), the trace information output controlling unit 664 outputs the trace information (step S726).

On the other hand, when the identified key ID is not "0", i.e., when the identified key ID shows the protected attribute of the protection (No in step S724), the output of the trace information is suspended and instead dummy information is supplied as an output (step S728). Thus, the trace information output process is completed. Thus, the output of the trace information can be controlled. Alternatively, an error indication may be supplied as an output.

Thus, when the protected attribute identified by the key ID stored in the key ID register of the executing unit 643 indicates the protection, the output of the trace information can be restricted, whereby the third party is prohibited from illegal access.

The structure and the process of the system 10 according to the fifth embodiment not specifically described above are same with the structure and the process of the system 10 according to other embodiments.

Next, a system 10 according to a sixth embodiment is described. The system 10 according to the sixth embodiment restricts the access to the data memory. In this regards, the system 10 according to the sixth embodiment is different from the system 10 according to the fourth embodiment.

Figure 29:
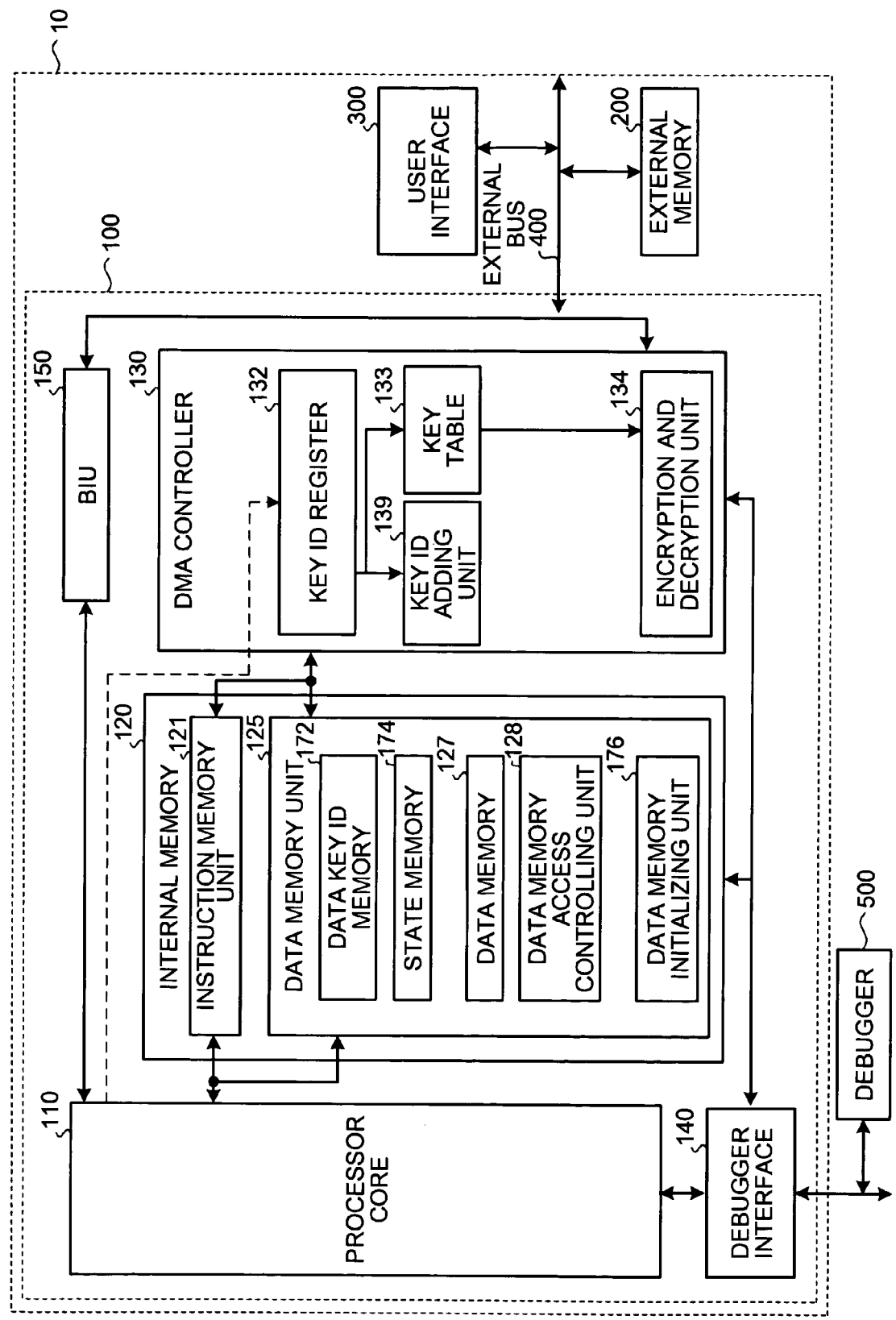
FIG. 29 is a diagram of an overall structure of a system 10 according to a sixth embodiment.

FIG. 29 is a diagram of an overall structure of the system 10 according to the sixth embodiment. A data memory unit 125 of the system 10 according to the sixth embodiment includes a data memory 127, a data key ID memory 172, a state memory 174, a data memory access controlling unit 128, and a data memory initializing unit 176 corresponding to the data memory 127.

The data memory 127 stores plaintext data acquired from the encryption and decryption unit 134 or plaintext data sent from the processor core 110 or the debugger 500, for example. The data key ID memory 172 stores key IDs added to the plaintext data stored in the data memory 127. The data memory access controlling unit 128 controls an external access to the data memory 127. The state memory 174, similarly to the state memory 162 according to the fourth embodiment, stores a state of data.

The data memory initializing unit 176 initializes the data memory 127 in response to a special instruction from outside, and also sets "0" to the key ID stored in the data key ID memory 172. The data memory initializing unit 176 also changes the protected state stored by the state memory 174 to the initialized state.

FIG. 30 is a schematic diagram of the access control rule for data reading in the data memory access controlling unit 128. As shown in FIG. 30, when the state of the requested program is the initialized state or the non-protected state, and the value of the key ID is "0", the reading is permitted regardless of the value of the added key ID.

When the requested program has the key ID other than "0" and the state of the program is the protected state, and the added key ID and the key ID acquired from the access request sender are of the same value, reading is permitted.

When the requested program has the key ID other than "0" and the added key ID and the key ID acquired from the access request sender are of different values, the error indication is given as an output. For combinations other than those described above, the error indication is supplied as an output.

Thus, since the access is restricted to the data to which the key ID indicating the protection is added, illegal reading out of particular plaintext data is prohibited. Further, since the access is restricted to the data whose key ID does not match, the third party is prohibited from illegally reading out the plaintext data.

FIG. 31 is a schematic diagram of the access control rule for the data writing in the data memory access controlling unit 128. As shown in FIG. 31, when the data is in the initialized state and the key ID is "0", the writing is permitted regardless of the value of the added key ID. When the requested data has the key ID "0" and in the non-protected state, and the key ID acquired from the access request sender is "0", the writing is permitted.

When the requested data has the key ID other than "0" and in the protected state and the added key ID and the key ID acquired from the access request sender are of the same value, the writing is permitted. When the requested data has the key ID other than "0" and the added key ID and the key ID acquired from the access request sender are of different values, the error indication is supplied as an output. For combinations other than those described above, the error indication is supplied as an output.

Since the access is restricted when the key ID added to the requested data does not match with the sent key ID, the third party is prohibited from partially overwriting and altering the plaintext data. Further, the data can be partially transferred. Still further, since the access is restricted to the data with key ID indicating the protection, illegal overwriting and alteration of particular plaintext data can be prevented.

Figure 32:
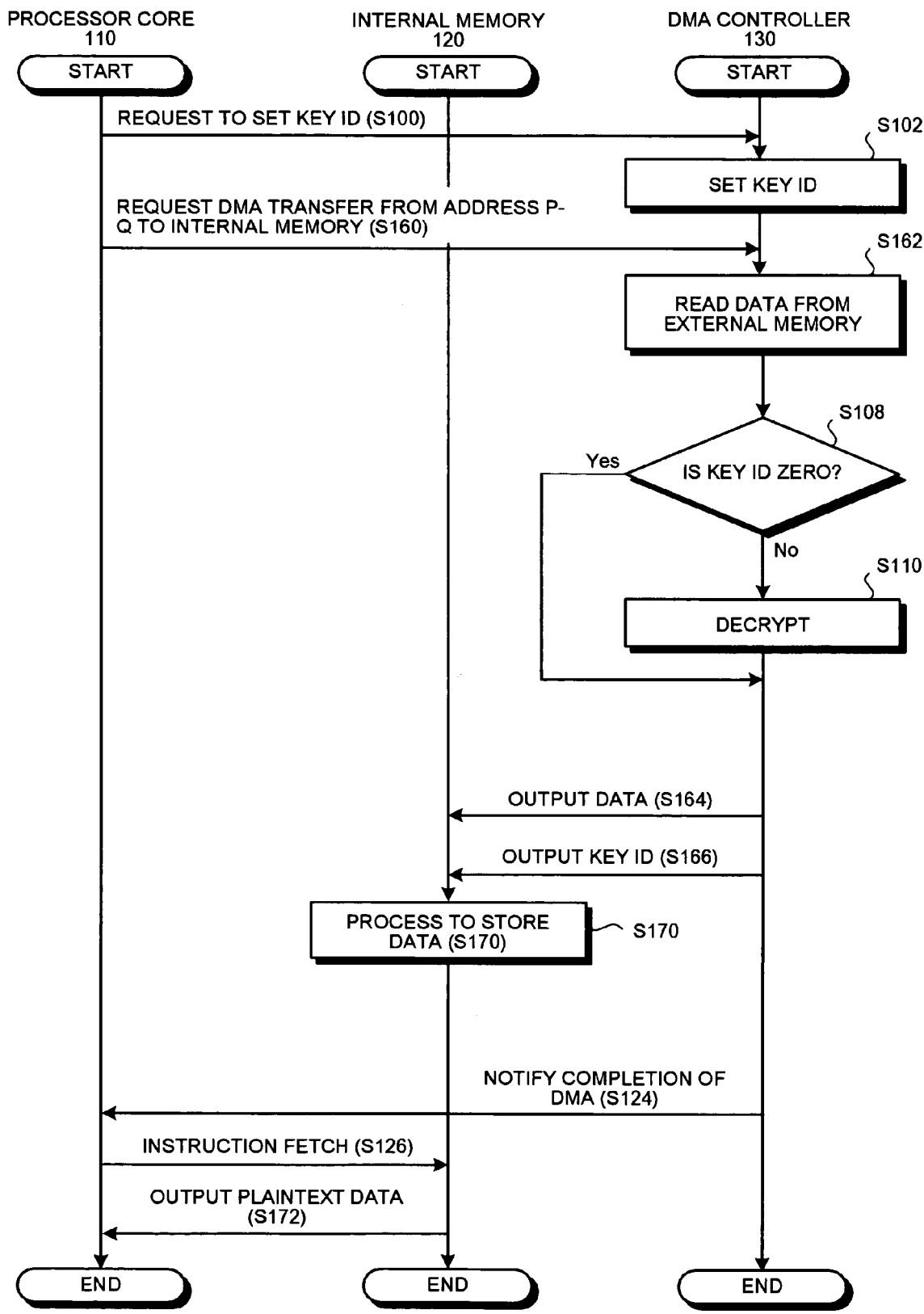
FIG. 32 is a flowchart of a writing process where data stored in the external memory is written into the internal memory via the DMA controller.

FIG. 32 is a flowchart of a writing process where the data stored in the external memory 200 is written into the internal memory 120 via the DMA controller 130. Here, the data is stored in addresses P to Q in the external memory 200.

The processor core 110, after sending a request to set a key ID to the DMA controller 130, sends the DMA transfer request to the DMA controller 130 (step S160). Here, the DMA transfer request is information to request the transfer of the data in addresses P to Q on the external memory 200 to the internal memory 120.

The DMA controller 130 reads out data E3[C(P to Q)] corresponding to addresses P to Q from the external memory 200 (step S162). Here, when the value set in the key ID register 132 is not "0" (No in step S108), the encryption and decryption unit 134 decrypts encrypted data E3[C(p to Q)] with a key which is acquired from a key table 133, to obtain plaintext data C(P to Q) (step S110).

Then, the data and the key ID are supplied as outputs (step S164, step S166), followed by data storing process (step S170). When the processor core 110 requests the read out of the plaintext data by the instruction fetch (step S126), the internal memory 120 outputs the requested plaintext data to the processor core 110 (step S172). The processing in the writing process other than specifically described above is same with the writing process according to the first embodiment.

Figure 33:
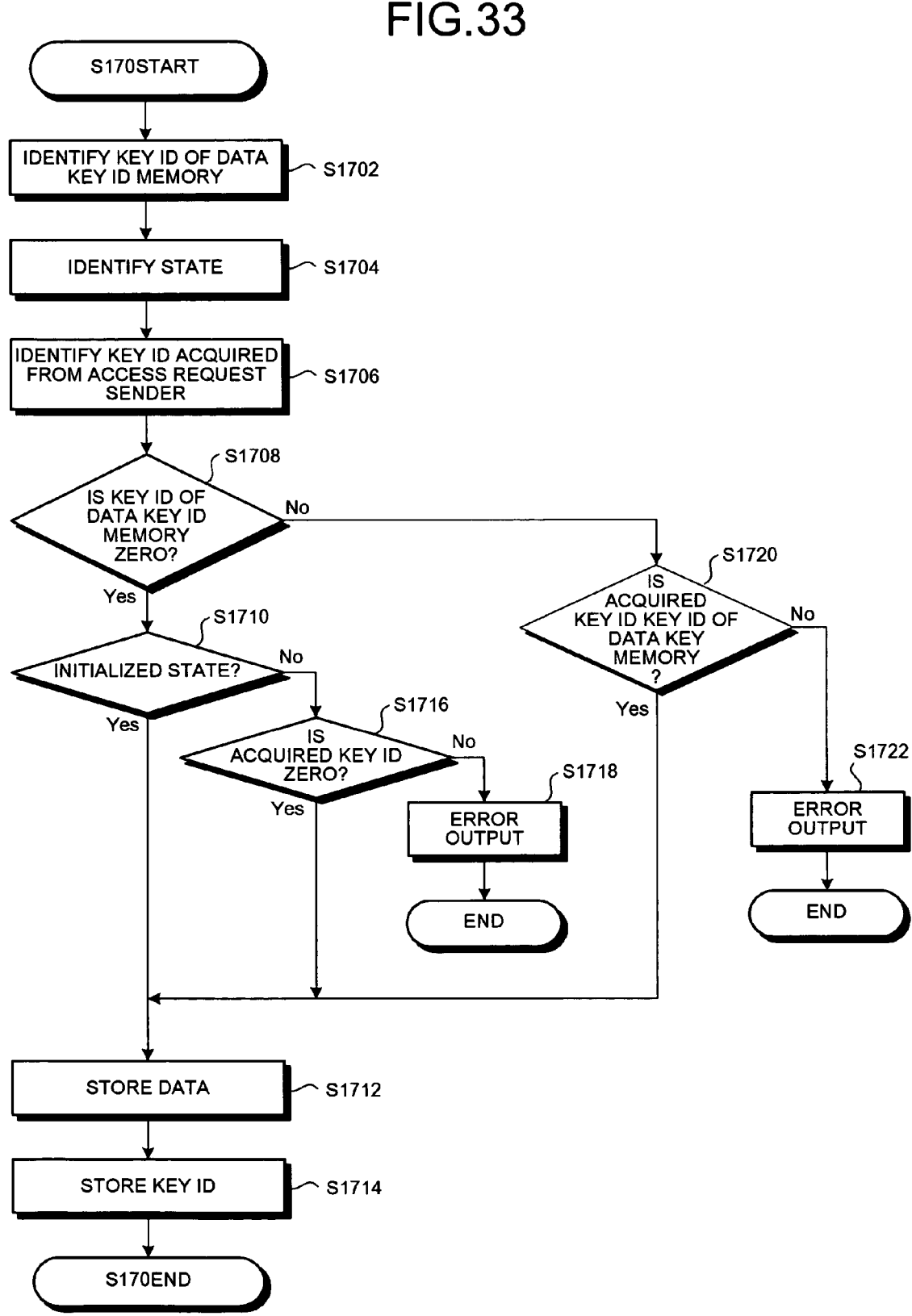
FIG. 33 is a flowchart of a process by the internal memory at data storing process in detail.

FIG. 33 is a flowchart of a detailed process by the internal memory 120 in the data storing process (step S170). After acquiring the plaintext data and the key ID in step S164 and step S166, the data memory access controlling unit 128 identifies the key ID stored in the data key ID memory 172 (step S1702), the state stored in the state memory 162 (step S1704), and the key ID acquired from the access request sender (step S1706).

Then, the data is stored in the data memory 128 only when the writing is permitted according to the rule of FIG. 31 (step S1712). Further, the key ID is stored in the key ID memory 172 (step S1714).

Specifically, the data is stored, when the key ID of the data key ID memory 172 is "0" and the data is in the initialized state (Yes in step S1708, Yes in step S1710); when the key ID of the data key ID memory 172 is "0" and the data is in the non-protected state, and the key ID acquired from the access request sender is "0" (Yes in step S1708, No in step S1710, Yes in step S1716); or when the key ID of the data key ID memory 172 is not "0" and the key ID acquired from the access request sender and the key ID of the data key ID memory 172 are of the same value (No in step S1708, Yes in step S1720).

Otherwise, the error indication is supplied as an output, i.e., when the key ID of the data key ID memory 172 is "0", the data is in the non-protected state, and the key ID acquired from the access request sender is not "0" (Yes in step S1708, No in step S1710, No in step S1716); or when the key ID in the data key ID memory 172 is not "0" and the acquired key ID and the key ID in the data key ID memory 172 are of different values (No in step S1708, No in step S1720).

Here, an overwrite request may be made via the processor core 110 for the data utilized in the software. For such purpose, the memory access unit of the pipeline sends a write request of the plaintext data to the internal memory 120. The memory access unit also sends the key ID stored in the key ID register.

In the system 10 according to the sixth embodiment, the data access can be controlled based on the values of the key ID acquired from the memory access unit and the key ID of the data key ID memory 172. In other words, the program associated with the key IDs with same value can be stored as data in the data memory 178. On the other hand, the access from the program associated with the key IDs of different values is restricted. In other words, when the user tries to store the program with the different key IDs in the data memory 127, the error indication is returned.

Thus, the illegal data writing by the third party who tries to access the data memory utilizing the store instruction or the like can be prohibited.

Further, the software alteration may be performed with the write request of the plaintext data stored in the internal memory 120 via the debugger interface 140 from the debugger 500.

Then, however, the key ID stored in the data key ID memory 172 is not "0" indicating the non-protection and does not match with the key ID sent from the debugger 500. Hence, the writing is restricted to the data memory 127 which shows the protected attribute indicating the protection according to the data storing process, i.e., the data writing process described with reference to FIG. 33. Thus the data memory access controlling unit 128 can prevent the overwrite of the plaintext data via the debugger interface 140.

Still further, the plaintext data may be illegally written by the third party via the DMA controller 130. For example, the debugger 500 may send the DMA transfer request to the internal memory 120 from the external memory 200 to the DMA controller 130 by specifying the key ID "0." Such a DMA transfer request is a request to transfer the data stored in a suitable area in the external memory 120 to an area in the internal memory 120.

Here, the DMA controller 130 transfers the data to the internal memory 120 in response to the DMA transfer request from the debugger 500. Specifically, the DMA controller 130 reads out the data from the external memory 200 and writes into the data memory 127 in the internal memory 120.

In such case, however, the key ID stored in the data key ID memory 172 is not "0" indicating the non-protection and does not match with the key ID "0" sent from the DMA controller 130 via the debugger 500. Hence, the overwrite to the data with the key ID indicating the protection is restricted according to the writing process described with reference to FIG. 33.

Thus, the debugger 500 can make access not only via the debugger interface but also via the DMA controller 130 or the BIU 150. In these cases as well, illegal overwrite by the third party can be prohibited.

FIG. 34 is a flowchart of a reading process where the data stored in the internal memory 120 is read out. The data memory access controlling unit 128 of the internal memory 120, on acquiring the read request for the read out of the data stored in the data memory 128 (step S250), identifies the key ID stored in the data key ID memory 172 as a key ID corresponding to the requested data, and identifies the state stored in the state memory 174 as a corresponding state (step S252).

When the identified ID, i.e., the key ID in the data key ID memory 172 is "0" and the state is the initialized state or the non-protected state (Yes in step S254, Yes in step S256), the data memory access controlling unit 128 outputs the key ID and the plaintext data stored in the data memory 127 (step S258, step S260).

When the key ID in the data key ID memory 172 is not "0" and the state is the protected state and the key ID of the data key ID memory 172 matches with the key ID acquired from the access request sender (No in step S254, Yes in step S270, Yes in step S272), the data memory access controlling unit 128 outputs the plaintext data and the key ID stored in the data memory 127 (step S258, step S260).

For the combinations other than those described above, the error indication is supplied as an output. For example: when the key ID in the instruction key ID memory 160 is "0" and the state is the protected state (Yes in step S254, No in step S256); when the key ID of the instruction key ID memory 160 is not "0" and the state is not the protected state (No in step S254, No in step S270); and when the key ID in the instruction key ID memory 160 is not "0", the state is not the protected state, and the request is not the instruction fetch from the processor core 110 (No in step S254, Yes in step S270, No in step S272), the error indication is supplied as an output (step S262, step S274).

In the system 10 according to the sixth embodiment, the protected attribute can be identified based on the key ID. Thus, similar to the system 10 according to the other embodiments, the data reading can be restricted based on the protected attribute and the type of request, whereby the illegal access by the third party can be prevented.

The structure and the process of the system 10 according to the sixth embodiment not specifically described above are same with the structure and the process of the system 10 according to the fourth embodiment.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A microprocessor comprising:
    an information acquiring unit that acquires information to be utilized by a processor core, the information being acquired from a source external to the microprocessor;
    a decryption unit that decrypts the acquired information to obtain plaintext information, when the acquired information is encrypted;
    a plaintext information storing unit that stores the plaintext information obtained by the decryption unit;
    a protected attribute adding unit that adds a protected attribute indicating one of protection and non-protection of the plaintext information based on whether the decryption has been performed;

an access request acquiring unit that acquires, from a device, an access request indicating a request by the device to access the plaintext information;
a request type identifying unit that identifies a type of request of the access request acquired from the device; and
an access controlling unit that controls access to the plaintext information based on the type of the access request acquired from the device and the protected attribute.

2. The microprocessor according to claim 1, wherein
the protected attribute adding unit adds the protected attribute indicating protection to the plaintext information obtained by the decryption unit; and
the access controlling unit restricts access to the plaintext information to which the protected attribute indicating protection is added.

3. The microprocessor according to claim 1, wherein
the plaintext information storing unit stores the plaintext information when the information is plaintext information which is not encrypted,
the protected attribute adding unit adds the protected attribute indicating non-protection to the plaintext information, and
the access controlling unit permits access to the plaintext information to which the protected attribute indicating non-protection is added.

4. The microprocessor according to claim 1, wherein
the access controlling unit restricts access to the plaintext information when the type of request is other than a registered type of request.

5. The microprocessor according to claim 4, wherein
the plaintext information storing unit is provided in an internal memory,
an instruction fetch by the processor core is registered as the registered type of request, and
the access controlling unit restricts access when the type of request is not the instruction fetch by the processor core.

6. The microprocessor according to claim 1, wherein
the access controlling unit permits access to the plaintext information when the type of request is a registered type of request.

7. The microprocessor according to claim 6, wherein
the access controlling unit restricts access to the plaintext information when the type of request is other than the registered type of request and when the plaintext information is added with the protected attribute indicating protection.

8. The microprocessor according to claim 1, wherein
the access controlling unit prohibits access to the plaintext information based on the type of request and the protected attribute.

9. The microprocessor according to claim 1, wherein the access controlling unit determines whether to output the plaintext information or encrypted information generated through encryption of the plaintext information based on the type of request and the protected attribute.

10. The microprocessor according to claim 1, wherein the access controlling unit restricts an overwrite of the plaintext information based on the type of request and the protected attribute.

11. The microprocessor according to claim 10, further comprising,
an overwrite instruction acquiring unit that acquires an overwrite instruction which indicates whether an overwrite of the plaintext information is permitted, wherein the access controlling unit permits the overwrite to the plaintext information on receiving the overwrite instruction indicating that the overwrite is permitted.

12. The microprocessor according to claim 1, wherein
the access controlling unit determines whether to delete the plaintext information already stored in the plaintext information storing unit, prior to the overwrite of the plaintext information, based on the type of request and the protected attribute.

13. The microprocessor according to claim 1, further comprising:
a cipher key storing unit that stores a plurality of cipher keys to be utilized for decryption; and
a protected attribute table that stores identification information of the cipher key and the protected attribute in association with each other, wherein the protected attribute adding unit adds the protected attribute, which is associated with the cipher key in the protected attribute table, as the protected attribute of the plaintext information.

14. The microprocessor according to claim 13, further comprising:
a cipher key specifying unit that accepts specification of the cipher key to be utilized for decryption from a user, and
the decryption unit decrypts the encrypted information utilizing the cipher key specified by the user.

15. The microprocessor according to claim 1, wherein
the plaintext information storing unit stores several pieces of the plaintext information and the protected attributes of the plaintext information in association with each other, and
the access controlling unit controls access for each piece of the plaintext information based on the type of request and the protected attribute which is associated with the plaintext information.

16. The microprocessor according to claim 1, wherein
the access controlling unit restricts access to the plaintext information to be utilized for an execution of a program by the processor core based on the type of request and the protected attribute.

17. The microprocessor according to claim 16, wherein
the processor core executes the plaintext information by pipeline processing, and
the access controlling unit restricts access to the plaintext information executed by the processor core based on the type of request and each of the protected attributes added to respective plaintext information executed by units of the processor core.

18. The microprocessor according to claim 17, further comprising:
a plurality of protected attribute storing units that stores the protected attribute of the plaintext information executed in each stage of the pipeline processing, one protected attribute storing unit for each stage; and
the access controlling unit restricts access to the plaintext information utilized for the execution of the program by the processor core based on each of the protected attributes stored by the plurality of protected attribute storing units.

19. The microprocessor according to claim 17, wherein
the access controlling unit restricts access to the plaintext information utilized for the execution of the program by the processor core when the plaintext information executed by at least one of the stages among plural stages in the processor core is added with the protected attribute indicating the protection.

20. The microprocessor according to claim 1, further comprising:
   a protected attribute storing unit that stores a protected attribute for a program executed by each stage of a pipeline in association with each stage; and
   a debug request acquiring unit that acquires a debug request from a debugger,
   wherein the access controlling unit permits access from the debugger when the all protected attributes at a time the debug request is acquired indicate non-protection.

21. The microprocessor according to claim 20, wherein
   the access unit restricts access from the debugger when at least one of the protected attributes at the time the debug request is acquired indicates protection.

22. The microprocessor according to claim 1, further comprising:
   a protected attribute storing unit that stores a protected attribute for a program executed by a processor core,
   wherein the access controlling unit permits output of trace information acquired from the microprocessor when the protected attribute indicates non-protection.

23. The microprocessor according to claim 22, wherein
   the access controlling unit restricts output of the trace information when the protected attribute indicates protection.

24. The microprocessor according to claim 1, wherein the device is:
   a processor core that executes a program,
   a direct memory access controller that transfers data between an external memory and an internal memory,
   a bus interface unit that outputs data to the external device or receives data input from an external device, or
   a debugger that debugs a program executing on the processor.

25. A microprocessor comprising:
   an information acquiring unit that acquires information to be utilized by a processor core, the information being acquired from a source external to the microprocessor;
   a decryption unit that decrypts the acquired information to obtain plaintext information, when the acquired information is encrypted;
   a plaintext information storing unit that stores the plaintext information obtained by the decryption unit
   a cipher key storing unit that stores a cipher key to be utilized for decryption;
   a key identification information adding unit that adds key identification information to identify the cipher key to the plaintext information;
   a key identification information storing unit that stores the key identification information;
   an access request acquiring unit that acquires, from a device, an access request indicating a request by the device to access the plaintext information
   a request type identifying unit that identifies a type of request of the access request acquired from the device; and
   an access controlling unit that controls access to the plaintext information based on the type of access request acquired from the device and the key identification information.

26. The microprocessor according to claim 25, wherein
   the key identification information is information which further indicates whether a protected attribute of corresponding plaintext information indicates protection or non-protection of the plaintext information, and
   the access controlling unit restricts access to the plaintext information when the protected attribute indicated by the key identification information indicates protection.

27. The microprocessor according to claim 25, wherein
   the key identification information is information which further indicates whether a protected attribute of corresponding plaintext information indicates protection or non-protection of the plaintext information, and
   the access controlling unit permits access to the plaintext information when the protected attribute indicated by the key identification information indicates non-protection.

28. The microprocessor according to claim 22, further comprising:
   an initialization instruction acquiring unit that acquires an initialization instruction which instructs initialization of the plaintext information storing unit; and
   an initializing unit that stores the key identification information that indicates that the protected attribute indicates non-protection in the key identification information storing unit when the initialization instruction is acquired.

29. The microprocessor according to claim 28, further comprising a state storing unit that stores state information which indicates whether the key identification information storing unit is in an initialized state, wherein the access controlling unit permits access to the plaintext information when the state information indicating the initialized state is stored.

30. The microprocessor according to claim 25, wherein
   the access controlling unit restricts access to the plaintext information when the type of request is other than a registered type of request.

31. The microprocessor according to claim 25, wherein
   the access controlling unit permits access to the plaintext information when the type of request is a registered type of request.

32. The microprocessor according to claim 31, wherein
   the access controlling unit restricts access to the plaintext information when the type of request is other than the registered type of request and when the protected attribute indicated by the key identification information indicates protection.

33. The microprocessor according to claim 25, wherein
   the access controlling unit prohibits access to the plaintext information based on the type of request and the protected attribute.

34. The microprocessor according to claim 25, wherein
   the access request includes the key identification information, and
   the access controlling unit controls access to the plaintext information based on the key identification information further included in the access request and the key identification information stored by the key identification information storing unit.

35. The microprocessor according to claim 34, wherein the access controlling unit permits access to the plaintext information when the key identification information included in the access request matches with the key identification information stored by the key identification information storing unit.

36. The microprocessor according to claim 25, wherein the access controlling unit determines whether to output the plaintext information or encrypted information generated by encryption of the plaintext information based on the type of request and the key identification information.

37. The microprocessor according to claim 25, wherein
the access controlling unit restricts access to the plaintext information utilized for an execution of a program by the processor core based on the type of request and the key identification information.

38. The microprocessor according to claim 37, wherein
the processor core executes the plaintext information by a pipeline processing, and
the access controlling unit restricts access to the plaintext information utilized for the execution of the program by the processor core based on the type of request and each of the key identification information added to respective plaintext information executed by units in the processor core.

39. The microprocessor according to claim 38, wherein
the key identification information storing unit includes a plurality of key identification information storing units that stores the key identification information of the plaintext information executed in each stage of the pipeline processing, one key identification information storing unit for each stage, and
the access controlling unit restricts access to the plaintext information utilized for the execution of the program by the processor core based on each of the key identification information stored by the plurality of key identification information storing units.

40. The microprocessor according to claim 38 wherein
the key identification information is information which further indicates whether the protected attribute of corresponding plaintext information indicates protection or non-protection, and
the access controlling unit restricts access to the plaintext information executed by the processor core when the protected attribute of the key identification information for the plaintext information executed by at least one stage among a plurality of stages of the processor core indicates protection.

* * * * *

UNITED STATES PATENT AND TRADEMARK OFFICE
CERTIFICATE OF CORRECTION

PATENT NO. : 7,707,645 B2
APPLICATION NO. : 11/159230
DATED : April 27, 2010
INVENTOR(S) : Haruki et al.

Page 1 of 1

It is certified that error appears in the above-identified patent and that said Letters Patent is hereby corrected as shown below:

Claim 11, column 23, line 63, change "comprising," to --comprising:--.

Claim 20, column 25, line 9, change "the all" to --all the--.

\* Claim 25, column 25, line 44, change "unit" to --unit;--.

\* Claim 25, column 25, line 54, change "information" to --information;--.

\* Claim 28, column 26, line 13, change "claim 22," to --claim 27,--.

Claim 40, column 28, line 9, change "claim 38 wherein" to --claim 38, wherein--.

Signed and Sealed this

Second Day of November, 2010

David J. Kappos
*Director of the United States Patent and Trademark Office*